(12) United States Patent
Trautner et al.

(10) Patent No.: US 11,878,754 B2
(45) Date of Patent: Jan. 23, 2024

(54) ELECTRICALLY OPERATED STEERING SYSTEM FOR A VEHICLE

(71) Applicant: Crown Equipment Corporation, New Bremen, OH (US)

(72) Inventors: Florian Trautner, Munich (DE); Dominik Hartinger, Munich (DE); Stefan Hannemann, Munich (DE)

(73) Assignee: Crown Equipment Corporation, New Bremen, OH (US)

( * ) Notice: Subject to any disclaimer, the term of this patent is extended or adjusted under 35 U.S.C. 154(b) by 0 days.

(21) Appl. No.: 18/052,966

(22) Filed: Nov. 7, 2022

(65) Prior Publication Data
US 2023/0081409 A1 Mar. 16, 2023

Related U.S. Application Data

(63) Continuation of application No. 17/032,470, filed on Sep. 25, 2020, now Pat. No. 11,745,794.

(30) Foreign Application Priority Data

Sep. 25, 2019 (DE) .......................... 102019125792.1

(51) Int. Cl.
*B62D 5/04* (2006.01)
*B62D 7/15* (2006.01)
*B62D 7/08* (2006.01)

(52) U.S. Cl.
CPC ......... *B62D 7/1509* (2013.01); *B62D 5/0421* (2013.01); *B62D 5/0445* (2013.01); *B62D 7/08* (2013.01); *B62D 5/0403* (2013.01)

(58) Field of Classification Search
CPC ...... B62D 5/0421; B62D 5/0445; B62D 7/08; B62D 7/1509
See application file for complete search history.

(56) References Cited

U.S. PATENT DOCUMENTS 2,178,367 A 10/1939 Dunham
3,262,109 A 7/1966 Swale et al.
(Continued)

FOREIGN PATENT DOCUMENTS

CN 103097230 A 5/2013
CN 103895697 A 7/2014
(Continued)

OTHER PUBLICATIONS

Simon Rose; Combined Search and Examination Report; dated Feb. 26, 2021; British Application No. 2015132.0; UK Intellectual Property Office.
(Continued)

*Primary Examiner* — Kevin Hurley
*Assistant Examiner* — Hosam Shabara
(74) *Attorney, Agent, or Firm* — Stevens & Showalter LLP

(57) ABSTRACT

An electrically operated steering system (1) is provided for a vehicle (2) with a rack (3) for attaching the steering system (1) to a frame of the vehicle (2), two steerable wheels (4) that are pivotably attached to the rack (3), a rod element (5) arranged on the rack (3), which is slidable in its longitudinal direction in relation to the rack (3), a kinematic unit (13), which is coupled to the rod element (5) and which transforms a movement of the rod element (5) into a steering rotation of the wheels (4), an electric machine (6), which is mechanically connected to the rod element (5) for effecting the movement of the rod element (5), and a lateral force absorbing mechanism (7), which is configured for absorbing a lateral force produced by the kinematic unit (13) in relation to the rod element (5).

32 Claims, 12 Drawing Sheets

(56) References Cited

U.S. PATENT DOCUMENTS

| | | | |
|---|---|---|---|
| 3,315,759 | A | 4/1967 | Bohlen |
| 3,572,459 | A | 3/1971 | Nieminski |
| 4,046,218 | A | 9/1977 | Blaisdell et al. |
| 4,597,468 | A | 7/1986 | Friedrich |
| 5,099,714 | A | 3/1992 | Hutchison et al. |
| 5,129,477 | A | 7/1992 | Hurlburt |
| 5,447,320 | A | 6/1995 | Hurlburt |
| 5,529,135 | A | 6/1996 | Wenzel et al. |
| 5,722,504 | A | 3/1998 | Gaetani |
| 6,325,396 | B1 | 12/2001 | Romig |
| 6,456,925 | B1 | 9/2002 | Romig |
| 6,557,658 | B1 | 5/2003 | Enmeiji et al. |
| 6,675,925 | B2 | 1/2004 | Takahashi et al. |
| 6,732,824 | B2 | 5/2004 | Sugata |
| 7,549,502 | B2 | 6/2009 | Gaetani |
| 7,686,107 | B1 | 3/2010 | Bland et al. |
| 7,763,825 | B2 | 7/2010 | Katae |
| 7,780,197 | B2 | 8/2010 | White |
| 7,861,820 | B1 | 1/2011 | Goodwin et al. |
| 8,448,729 | B2 | 5/2013 | Schena et al. |
| 8,678,405 | B2 * | 3/2014 | Tashiro ............... B62D 7/16 280/93.51 |
| 8,770,333 | B2 * | 7/2014 | Panizzolo ............ B62D 11/10 180/364 |
| 8,844,953 | B2 | 9/2014 | Smyth et al. |
| 8,851,489 | B2 | 10/2014 | Balboni |
| 8,950,521 | B2 | 2/2015 | Piontek |
| 9,365,236 | B2 | 6/2016 | Ruebusch et al. |
| 9,409,596 | B2 | 8/2016 | Hauser et al. |
| 9,538,706 | B2 | 1/2017 | Haun |
| 9,854,736 | B2 | 1/2018 | Fox et al. |
| 2003/0019682 | A1 | 1/2003 | Schaedler et al. |
| 2003/0070862 | A1 | 4/2003 | Tartara |
| 2004/0227395 | A1 * | 11/2004 | Katae ................. B66F 9/07568 301/124.1 |
| 2010/0259023 | A1 | 10/2010 | Cebon et al. |
| 2013/0119627 | A1 | 5/2013 | Tashiro |
| 2015/0321693 | A1 | 11/2015 | Büttner et al. |
| 2016/0236710 | A1 | 8/2016 | Ohba et al. |
| 2016/0347363 | A1 | 12/2016 | Fang et al. |
| 2021/0086830 | A1 | 3/2021 | Trautner |

FOREIGN PATENT DOCUMENTS

| | | |
|---|---|---|
| CN | 106809274 A | 6/2017 |
| CN | 108437784 A | 8/2018 |
| CN | 109677221 A | 4/2019 |
| DE | 19960946 A1 | 6/2001 |
| DE | 602004004240 T2 | 7/2007 |
| DE | 102011120126 A1 | 6/2013 |
| EP | 2042407 B1 | 11/2013 |
| EP | 3093216 A1 | 11/2016 |
| GB | 2589965 A * | 6/2021 ........... B62D 27/065 |
| JP | H11001179 A | 1/1999 |
| JP | 2005022489 A | 1/2005 |
| JP | 2005022489 A * | 1/2005 |
| JP | 2018511755 A | 4/2018 |
| JP | 2019116122 A | 7/2019 |
| WO | 2013054357 A2 | 4/2013 |
| WO | 2016120797 A1 | 8/2016 |
| WO | 2016139014 A1 | 9/2016 |
| WO | 2016150625 A1 | 9/2016 |

OTHER PUBLICATIONS

Ju-Chan Lee; Notice of Preliminary Rejection; dated Aug. 6, 2021; Korean Application No. 10-2020-0124654; Korean Intellectual Property Office; Daejeon, Korea.

Angus Shorter; Examination report No. 1; dated Apr. 30, 2021; Australian Application No. 2020239642; IP Australia; Canberra, Australia.

Office Action; German Patent Application No. 102019125792.1; dated Mar. 20, 2020; German Patent and Trademark Office; Munich, Germany.

Hosam Shabara; Office Action; U.S. Appl. No. 17/032,470; dated Jun. 10, 2022; United States Patent and Trademark Office; Alexandria, VA.

Hosam Shabara; Notice of Allowance; U.S. Appl. No. 17/032,470; dated Sep. 29, 2022; United States Patent and Trademark Office; Alexandria, VA.

Office Action dated Jan. 20, 2022; Korean Application No. 10-2020-0124654; Korean Intellectual Property Office; Daejeon, Republic of Korea.

Office Action dated Aug. 10, 2022; China Application No. 202011023358.8; China National Intellectual Property Administration; Beijing, China.

Soucy, Catherine; Examination Report dated Nov. 5, 2021; Canadian Application No. 3094155; Canadian Intellectual Property Office; Quebec, Canada.

Shorter, Angus; Examination Report dated Apr. 29, 2022; Australian Application No. 2020239642; IP Australia; Canberra, Australia.

Kumbhojkar, Niteen G.; Patent Application—Hydraulic Steering System for Zero Turning Radius With Adjustable Height Using Drum-Cam Piston Combination; IIN201721028938; Sep. 15, 2017.

Notice of Allowance dated May 24, 2023; U.S. Appl. No. 17/032,470; United States Patent and Trademark Office; Alexandria, Virginia.

* cited by examiner

ELECTRICALLY OPERATED STEERING SYSTEM FOR A VEHICLE

CROSS REFERENCE TO RELATED APPLICATIONS

This application is a continuation application of U.S. patent application Ser. No. 17/032,470, filed Sep. 25, 2020 and entitled "Electrically operated steering system for a vehicle", which claims the benefit of German Patent Application No. 102019125792.1, filed Sep. 25, 2019, the entire disclosures of each of which are hereby incorporated by reference herein.

TECHNICAL BACKGROUND

The present invention relates to an electrically operated steering system for a vehicle. In particular, the invention relates to an electrically operated steering system that achieves an extended steering angle range with a simple electric drive mechanism. In addition, the invention concerns a vehicle equipped with such an electrically operated steering system.

RELATED ART

Various electrically operated steering systems for vehicles are known from the prior art. At present, various solutions for an electric drive of the steering system of vehicles are available which, for example, include an electric direct drive of an axle journal of steered wheels or an electric operation of hydraulic systems for steering systems, which are basically operated as hydraulic systems. However, some steering systems that are known from the prior art are complicated or inefficient. Other electrically operated steering systems known from the prior art involve certain restrictions regarding the operation and, in particular, the steering angle range.

DETAILED DESCRIPTION OF THE INVENTION

An electrically operated steering system may comprise the following: a rack for attaching said steering system to a vehicle frame of a vehicle; two steerable wheels, which are pivotably attached to said rack; a rod element arranged to said rack, said rod element being slidable in its longitudinal direction in relation to said rack; a kinematic unit, which is coupled to said rod element and which transforms a movement of said rod element into a steering rotation of said wheels; an electric machine being mechanically connected to said rod element for effecting the movement of said rod element. Further, the electrically operated steering system can comprise a lateral force absorbing mechanism arranged for absorbing a lateral force produced by said kinematic unit in relation to said rod element.

With this structure, the rack may be adapted to the requirements for arranging the same at the vehicle, as long as the rack can carry steerable wheels. The rack may be formed as single part or with multiple parts. The rod element according to this solution is arranged at the rack in order to directly or indirectly act on the steerable wheels.

The kinematic unit effects a conversion of the movement of the rod element, which is substantially a translational movement along the longitudinal direction of the rod element, into a steering rotation of the wheels. The movement of the rod element is effected by the electric machine, wherein between an output element of the electric machine and the rod element further elements may be provided, which are adapted for this purpose. Forces with varying spatial direction are produced by the kinematic unit due to the conversion of the translational movement of the rod element into a steering rotation by using the kinematic unit. In this context, such forces are also produced, the direction of which deviates from the longitudinal direction of the rod element, which forces are also defined as lateral forces in relation to the rod element.

According to an embodiment, the lateral force absorbing mechanism may be arranged for conveying a lateral force produced by said kinematic unit to said rack. In this case, the lateral force absorbing mechanism may be arranged such that the lateral force produced by the kinematic unit does not or not substantially act on the rod element. In this case, the lateral force produced by the kinematic unit can be absorbed by one or multiple elements of the lateral force absorbing mechanism and conveyed into the rack, wherein the elements are coupled to the rod element.

According to an embodiment, the lateral force absorbing mechanism may be arranged for absorbing a lateral force acting between said kinematic unit and said rod element in order to convey said lateral force to said rack. In this case, it is possible that the lateral force produced by the kinematic unit acts completely or partially on a portion of the rod element and is then conveyed to the rack from the elements of the lateral force absorbing mechanism. In this case, the elements of the lateral force absorbing mechanism, which convey the lateral force from the rod element to the rack, may be arranged in the portion of the rod element on which the lateral force acts. The portion of the rod element may be selected in such a way that a detrimental effect to the function of the rod element is avoided or reduced.

In summary, the lateral force absorbing mechanism is arranged so as to reduce the effects of the lateral force produced by the kinematic unit to the rod element and system components connected to the rod element. For this reason, the transmission of the lateral force to the rod element can be completely disabled or the portion of the rod element on which the lateral force acts can be limited. In either case, the lateral force produced by the kinematic unit is completely or at least partially conveyed into the rack of the electrically operated steering system.

According to an embodiment, the lateral force absorbing mechanism may comprise a support assembly connected to said rack that absorbs a lateral force. The support assembly may be formed by multiple elements that are connected to the rack in a way that the rack can absorb the force, which acts on the support assembly. In order to achieve a compact structure of the lateral force absorbing mechanism, the support assembly may at least partially extend along the rod element in order to reflect the shape of the rod element being a longitudinal body.

According to an embodiment, the support assembly may extend at least partially along a movement path of the rod element and may be arranged substantially parallel to said movement path of the rod element. Due to the function of the electrically operated steering system, the rod element is moved in its longitudinal direction. In this context, a predetermined movement path is defined in correspondence with the setup of the steering system. With this arrangement, it is possible to convey the lateral force produced by the kinematic unit even during the movement of the rod element through the support assembly into the rack.

According to an embodiment, the lateral force absorbing mechanism may comprise a stabilizing element engaged to the support assembly for transmitting the lateral force to the support assembly, the stabilizing element being provided between the rod element and the support assembly. The stabilizing element may have any structure that enables the transmission of the lateral force to the support assembly. In particular, the lateral force produced by the kinematic unit can directly act on the stabilizing element such that a direct effect of the lateral force to the rod element is avoided or at least reduced. When the lateral force produced by the kinematic unit is introduced into a portion of the rod element, the stabilizing element can absorb the lateral force introduced into the rod element and transmit the same to the support assembly. In this case, it is advantageous to arrange the stabilizing element at the portion of the rod element on which the lateral force acts. In this way, the area of the rod element on which the lateral force acts can be restricted.

According to an embodiment, the stabilizing element may be arranged in a region of an end portion of the rod element oriented to the respective wheel. A lateral force acting on the rod element can advantageously be conveyed away from the portion into which the lateral force is conveyed. When the lateral force produced by the kinematic unit is in particular conveyed to the end portion of the rod element or an element mounted to the rod element, the position of the stabilizing element at this end portion of the rod element is beneficial.

According to an embodiment, with respect to a longitudinal direction of the rod element, the stabilizing element is immovably connected to the rod element. With this arrangement it is possible to provide the stabilizing element at a constant position with respect to the longitudinal direction of the rod element and that the stabilizing element is conveyed with the rod element upon its movement.

According to an embodiment, the stabilizing element may comprise wing elements that protrude in two radial directions in relation to the rod element. With this arrangement, the lateral force can preferably be conveyed through the wing elements of the stabilizing element and, at the same time, a compact structure is realized.

According to an embodiment, the wing elements of the stabilizing element are substantially wedge-shaped and tapered in the radial outward direction. This structure thus further improves the compact arrangement of the system.

According to an embodiment, the support assembly may comprise at least two frame wings, wherein one or both frame wings may get into contact with the stabilizing element. The frame wings can support the stabilizing element in this way and convey the lateral force acting on the stabilizing element to the rack. In this case, it is possible in predetermined conditions, that no direct contact exists between the frame wings and the stabilizing element as long as such a contact is allowed upon the transmission of a force between the stabilizing element and the frame wings.

According to an embodiment, at least one and preferably each frame wing may comprise at least one protrusion that enables an engagement between the stabilizing element and the support assembly, at least in a rotational direction about a rotational axis defined by the rod element. In particular, the stabilizing element in this arrangement is provided rotatably about the rod element. In this way, the transmission of a torque or moment between the stabilizing element and the rod element is avoided or at least reduced. In this way, a defined contact without generating tensions or the like can be created in relation to the support assembly. In addition, certain deviations regarding the movement upon shifting the rod element may be taken into account and allowed by the rotatable arrangement of the stabilizing element. The protrusion of the frame wing has the purpose of avoiding a rotation of the stabilizing element in relation to the support assembly. The shape of the protrusion is adapted to the design of the stabilizing element, and the size and form of the protrusion is arbitrarily adaptable as long as the rotation of the stabilizing element in relation to the support assembly is prevented.

According to an embodiment, the frame wings may be connected by a frame base in such a way that the support assembly defines at least partially a C-form in its cross-section. In this way, an open profile is provided wherein the stabilizing element can be inserted from the open side into the support assembly. Further, this arrangement provides a favorable stability and is mountable to the rack with simple means.

According to an embodiment, the support assembly may comprise at least two guiding members on two opposite sides of said rod element, said guiding members being arranged separately from each other and extending along the rod element. In this case, the separate guiding members may be aligned substantially parallel to the rod element such that the distance between the rod element and the stabilizing member, respectively, and the guiding members remains substantially constant during the movement of the rod element.

According to an embodiment, the guiding members may have a cross-section that is open towards the stabilizing element, wherein an outer portion of the stabilizing element is guided along a longitudinal direction of the rod element in such a way that the outer portion is restricted in its rotational movement by the respective guiding member. In this case, the frame wings of the guiding members are used for absorbing the lateral force conveyed from the stabilizing element, and, at the same time, the contact of the outer portion of the stabilizing element with the frame wings prevents a rotation of the stabilizing element in relation to the rod element. In this way, a very simple structure is achieved for conveying the lateral force into the rack with simple means.

According to an embodiment, the guiding members may each be formed with a round cross-section and are each led through a respective guiding bore, which are provided in the stabilizing element in order to guide the stabilizing element along the longitudinal direction of the rod element. The round cross-section may be a circular cross-section such that the guiding members are at least partially formed as cylindrical rods. In this embodiment, the provision of the stabilizing elements at the guiding members has the effect of preventing a rotation of the stabilizing element in relation to the rod element, and, at the same time, the lateral force can be introduced to the guiding members. In this case, the stabilizing element can be guided in the longitudinal direction along the guiding members. Between the guiding bore and the guiding members, a predetermined tolerance may be provided as long as contact between the inner circumference of the guiding bore and the guiding members is enabled, if it is required to convey the lateral force. The arrangement of the guiding members in the guiding bores may also be provided free of tolerance, thereby providing an accurate arrangement. Instead of the bore that is circular according to the shape of the guiding members, an elongated hole or the like may be provided. In addition, it is possible to provide a slit or an interruption in the circumference of the bore such that a certain flexibility at the inner circumference of the bore is achieved. Further, it is possible to provide a fork-shaped arrangement at the stabilizing element instead of the bore, wherein the inner sides thereof can be in engagement with the guiding members.

According to an embodiment, a slide coating may be provided on a surface of the stabilizing element contacting the support assembly and/or on a surface of the support assembly contacting the stabilizing element. The slide coating improves a movement of the stabilizing element with the rod element in relation to the support assembly in the longitudinal direction of the rod element. For this purpose, any material and any structure may be used as long as the effect is achieved that the movement of the stabilizing element is improved in relation to the support assembly, for example by reducing the friction. In this context it is possible to use elements or coatings based on PTFE, ceramic materials, or the like.

According to an embodiment, between a respective end portion of the rod element and the respective wheel, a respective kinematic unit may be arranged, that is configured to achieve a steering rotation of the corresponding wheel in a predetermined angle range. For example, the kinematic unit may be configured such that an angle range of at least 175° is achieved. The configuration of the kinematic unit is arbitrarily selectable as long as the previously indicated steering rotation due to the translational movement of the rod element is achievable. For this purpose, hinge arrangements may be useable that are constructed for this function.

According to an embodiment, the kinematic unit may comprise an axle journal, the axle journal being pivotable together with the wheel about a steering axis and radially protruding from the steering axis. The axle journal may be coupled to the rod element with a transmission member being hingedly connected on both sides, the transmission member being arranged for transforming a movement of the rod element into a rotation of the axle journal and thus of the wheel. In this way, the translational movement of the rod element is transformed into the rotational movement for steering the wheel with simple means. In this case, the kinematic unit may comprise multiple transmission members that lead to the predetermined function. Due to the use of transmission members that are hingedly supported on both sides, lateral force is produced with the previously discussed construction, the lateral force being in particular relevant for high steering angles, which deviate from the straightforward drive.

According to an embodiment, the transmission member may be coupled to the rod element by means of a lug portion mountable to the rod element. The lug portion may have any form as long as the transmission member can be hingedly coupled to the lug portion. The lug portion may be mounted to the rod element such that the lug portion is fixedly arranged thereto. The lug portion may also be connected to the rod element as a unitary piece or be firmly bonded thereto. In particular, the lug portion is provided for transmitting the force between the rod element and the transmission member. In a particular embodiment, it is possible to couple the stabilizing element directly or indirectly to the lug portion. In this way, the lateral force produced by the transmission member is not transmitted to the rod element, as the lateral force is conveyed by the stabilizing element to the rack. When the stabilizing element is not directly coupled to the lug portion, the lateral force produced by the transmission member is introduced by the lug portion to at least the portion of the rod element in which the lug portion is provided. In this case, the stabilizing element is arranged at a portion of the rod element close to the lug portion such that the effect of the lateral force to the rod element is limited to that portion. The transmission member may be connected to the lug portion by means of a screwed connection, a ball hinge connection, or any other connection as long as a hinged arrangement is enabled and the corresponding force transmission is achievable.

According to an embodiment, the rod element may be formed at least partially as spindle with a thread. In this case, the thread may be provided on the outside of the spindle. The thread may have a single winding or multiple windings. Moreover, the thread may be a trapeze thread or a ball spindle thread. The spindle may be formed with any usable material, however, it is preferable to use a metal, in particular a steel material. Due to the loads in some applications, a high strength material with a high surface quality may be used.

According to an embodiment, the electrically operated steering system may further comprise a conversion mechanism, which is arranged for converting a rotation of the electric machine into a translational movement of the rod element in relation to the conversion mechanism. The conversion mechanism may have any structure that enables the conversion of the rotation of the electric machine into the translational movement of the rod element.

According to an embodiment, the rod element may be mounted in a torque-proof manner in relation to the conversion mechanism, wherein a translational movement of the rod element is effected by a rotation of a threaded component in relation to the rod element, the threaded component engaging with the thread on the spindle. With this concept, a screw-type drive of the rod element is achieved whereby the translational movement of the rod element is enabled. The rod element may be fixed at arbitrary positions thereof in relation to the rack. In particular, the rod element may be mounted in a torque-proof manner by the kinematic unit, which is connected to the rod element. In this case, the lug portion may be mounted to the rod element in a torque-proof manner, while the lug portion is in turn coupled to the transmission member in a torque-proof manner, wherein the transmission member is hingedly supported on both sides. For this case, the construction is such that a rotation of the rod element in relation to the rack is prevented. The threaded component may be rotatable in the conversion mechanism. The threaded component is immovable in the longitudinal direction of the rod element such that the rotation of the threaded component in relation to the rod element enables the translational movement. The coupling between the electric machine and the threaded component may be freely selected and may comprise a gear transmission, a belt transmission, or the like. The threaded component may be arranged as circulating ball system, whereby the friction and accuracy in operation are improved. However, any type of threaded component may be used as long as the rotation of the threaded component in relation to the rod element enables the desired positioning. It is also possible to employ a system in which the spindle is rotated and the threaded component is stationary. In this case, the elements of the system can be adapted in a simple way.

According to an embodiment, the electric machine may be coupled to the threaded component in order to effect a rotation of the threaded component of the conversions mechanism. The electric machine may be any type as long as a sufficient accuracy in positioning is enabled. Here, brushless motors may be used, wherein the already existing sensors for positioning may be employed. However, it is also possible to use other motors and to employ sensors in the system, which enable positioning and rotational control of the electric machine.

According to an embodiment, the electrically operated steering system may further comprise a controller that is arranged for controlling a rotation of the electric machine such that an actual steering angle approaches a predefinable target steering angle. In this case, the controller may detect the position and rotational speed as well as optional further values of the electric machine or of the steering system and, in relation to the predefinable target steering angle, control the motor accordingly. The predefinable target steering angle may be provided by a steering wheel with a corresponding sensor arrangement of the corresponding vehicle, which is operated by an operator. In particular, upon rotating the steering wheel, a signal is produced that is transformed into a target steering angle by the controller. In this way, the electrically operated steering system can be controlled by means of the controller such that the steering angle predefined by the steering wheel is achieved at the steered wheels. The predefinable target steering angle may also be delivered from an automatic system. In particular it is possible to employ a driverless system in which the target steering angle is provided by a computer system. Moreover, it is possible to define a zero turn steering angle as the target steering angle by means of an operation element or an external controller, wherein the steered wheels of the electrically operated steering system are controlled such that the vehicle on which the steering system is mounted is operable with a zero turn functionality. With the zero turn functionality, the steered wheels are controlled such that a rotation of the vehicle about a vertical axis is achieved, which vertical axis crosses a connection axis between the centres of wheels of the non-steerable axis. The zero turn functionality may also be referred to as functionality with a turn of zero, in which a turn circle of zero or approximately zero is achievable in relation to the axis comprising the non-steerable wheels of a vehicle.

According to an embodiment, the rack may be attachable to a vehicle by a central flange unit. By this central flange unit, a portal type structure is enabled in which a pivoting movement of the rack in relation to the vehicle is enabled. In this way, uneven characteristics of the ground can be absorbed. Further, a damping system may be provided, which can damp the pivoting movement of the rack in relation to the vehicle.

According to an embodiment, in the electrically operated steering system, those elements that relate to the drive of the steering system may be accommodated in a compartment that is arranged above the rotational centres of the wheels, preferably above the wheels.

According to an embodiment, in the electrically operated steering system, the elements can comprise the conversion mechanism, the rod element, the kinematic unit, and optionally the electric machine. With this arrangement, a steering system may be provided in which the steering rotation of the wheels is not limited or restricted by the elements of the steering system. The corresponding elements can be combined in a compact way. The electric machine may optionally be arranged outside the compartment.

According to an embodiment, in the electrically operated steering system, the compartment may be closed off to the environment for protection of the elements. With this arrangement, the corresponding elements can be protected from outside influences, in particular from dirt and intruding humidity. The compartment may not be completely closed but may include openings, for example ventilation openings or the like. A detachable lid may be provided in order to be able to open the compartment if needed, for example for performing required maintenance work.

A vehicle may be provided that comprises a vehicle frame and at least one electrically operated steering system according to one or multiple of the preceding embodiments. The vehicle may be any vehicle. Further, the vehicle may be an industrial truck or any other transport vehicle. The vehicle may be provided with two axles, wherein one of the axles is provided with the electrically operated steering system, while the other axle is non-steerable. In addition, it is possible to equip a vehicle with two axles such that both axles are equipped with an electrically operated steering system according to one or multiple of the previously discussed embodiments. With such an arrangement, a four-wheel steering vehicle is achieved with a higher degree of freedom regarding the available steering positions. In particular, with this structure, a four-wheel turn drive, a side drive, or combinations thereof can be achieved. In the case where both axles comprise an electrically operated steering system with a zero turn functionality, a rotation of the vehicle about a vertical axis that crosses the vehicle is enabled.

A counterbalance forklift truck may comprise the following: a vehicle frame, a lift frame with a carriage, the lift frame being arranged at a front side in relation to a vehicle longitudinal direction, a stabilizing counterweight arranged on the rear side in relation to the vehicle longitudinal direction, said counterweight being adapted to counteract a tilting of the counterbalance forklift truck, at least one front wheel arranged on the front side in relation to the vehicle longitudinal direction, wherein the counterbalance forklift truck further comprises an electrically operated steering system according to one or multiple of the previously discussed embodiments, the electrically operated steering system being on the rear side in relation to the vehicle longitudinal direction, arranged on the vehicle frame by means of the rack, and which is constructed for steering rear wheels of the counterbalance forklift truck.

The invention is applicable with advantages to the counterbalance forklift truck as the requirement of the complete electrification of the elements of such vehicles exists and, on the other hand, a zero turn functionality in such vehicles is of high relevance. By means of the present invention, an electrically operated steering system with a simple structure may be employed in a vehicle in which high loads occur and in which, at the same time, a zero turn functionality is of advantage. With the proposed steering system it is possible to employ a system that is sensitive with respect to lateral forces and which provides a wide steering angle range.

DETAILED DESCRIPTION OF THE EMBODIMENTS

In the following, specific embodiments of the present invention are explained by reference to the appended drawings. The drawings are merely of schematic nature. They only serve as explanation of the invention and are not intended to limit the scope of the claims.

Figure 1:
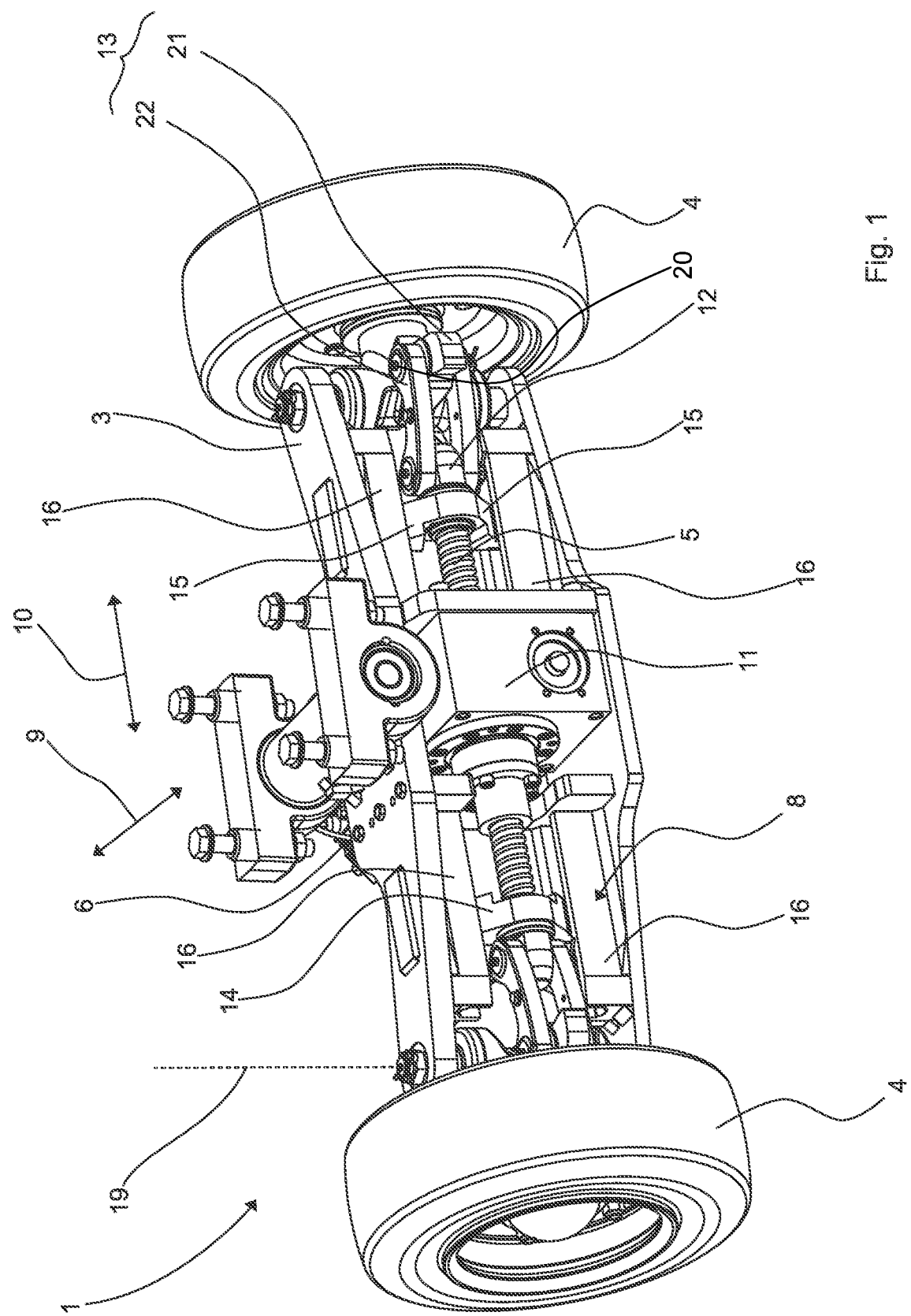
FIG. 1 shows a perspective view of an electrically operated steering system according to a first embodiment.

FIG. 1 shows the electrically operated steering system 1 for a vehicle 2. The vehicle is explained below in greater detail with reference to FIG. 20 based on an exemplary counterbalance forklift truck. The electrically operated steering system 1 comprises two wheels 4, wherein the suspension thereof is substantially identical and due to the construction on both sides of the system arranged in a mirror-inverted manner. In the following, the embodiments are explained in some portions by reference to a wheel 4 and the actuation and suspension thereof, wherein the respective description is applicable to the second wheel 4 of the steering system as well.

The electrically operated steering system 1 is arranged between both wheels 4 in the vertical direction as well as in the horizontal direction. Based on this arrangement, an optimized utilization of the available space is achieved. The electrically operated steering system 1 has a rack 3 that may be coupled to a vehicle frame of the vehicle 2. Two steerable wheels 4 are pivotably attached to the rack 3. The steering rotation or pivotable movement of the wheels 4 is effected by a shift of a rod element 5, which is provided between the wheels 4. The movement performed by the rod element 5 constitutes a shift along a shifting path.

An exclusively mechanical connection is provided between the electric machine 6 and the rod element 5. In order to compensate high lateral forces that act in particular in a range of a maximum steering angle, the present invention proposes to use a lateral force absorbing mechanism 7, which is shown in greater detail in FIG. 7 and explained below. The lateral force absorbing mechanism 7 comprises a support assembly 8 in the present embodiment. The vehicle 2 does not experience a turning movement in the steering angle that is shown in FIG. 1 and, thus, drives straight forward.

Figure 2:
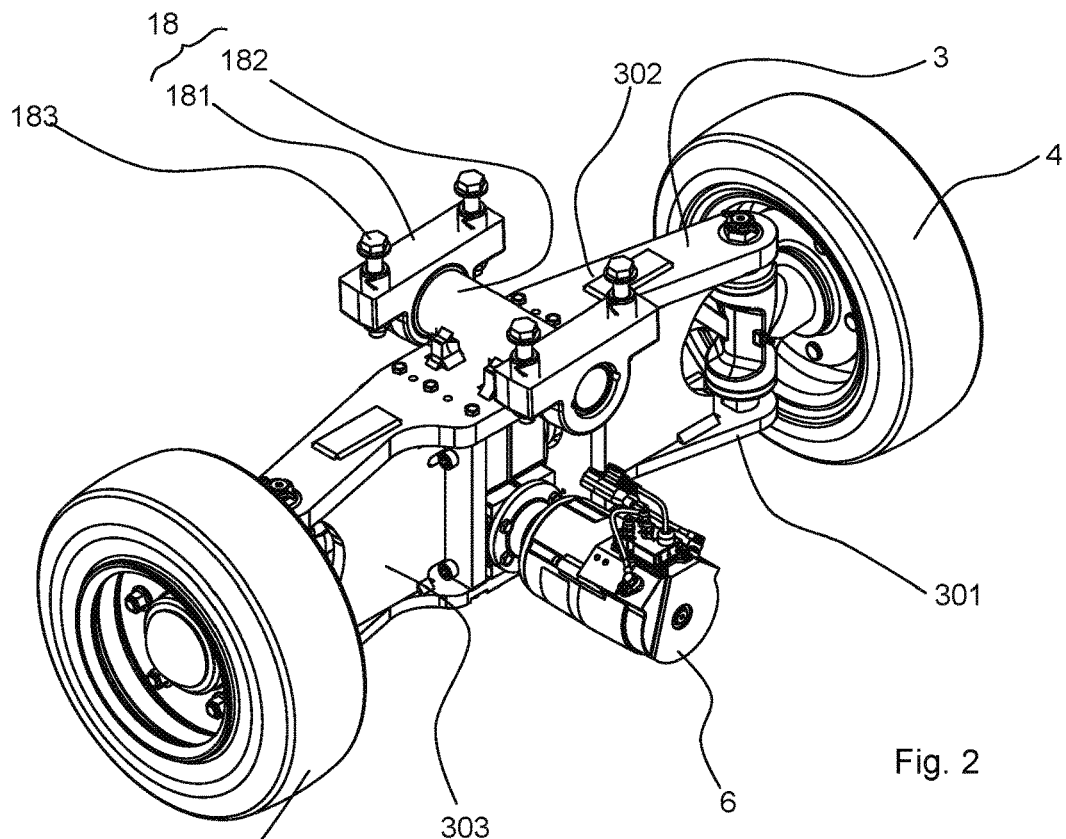
FIG. 2 shows the electrically operated steering system of FIG. 1 in another perspective view.

As shown in FIG. 2, an electric machine 6 is, in relation to the rod element 5 that is arranged in a vehicle width direction 10, offset with respect to a vehicle longitudinal direction 9. The rotation of an output shaft of the electric machine 6 is converted into a shift of the rod element 5 without rotating the same by a conversion mechanism 11. In order to achieve this, the rod element 5 is formed as a threaded spindle in the present embodiment. A shift of the rod element 5 is transferred through a rod element attachment member 12 to a kinematic unit 13, which, in turn, effects the steering rotation of the respective wheel 4. The kinematic unit 13 comprises an axle journal 21 and a transmission member 22 as shown in FIG. 1. In this embodiment, the axle journal 21 is formed unitary with a part that is attached to a wheel hub of the wheel 4, and with a part surrounding a steering axis 19. It is a characteristic feature of the axle journal 21 that the axle journal 21 radially protrudes from the steering axis 19. The transmission member 22 is hingedly coupled to the axle journal 21. For example, the hinge function between the axle journal 21 and the transmission member 22 is realized by a bolt 20 and two lugs that are arranged in the transmission member 22. In order to achieve an increased rotational range of the axle journal 21 and, thus, of the respective wheel 4, the transmission member 22 is also hingedly supported on its end, which faces away from the axle journal 21. In order to achieve this, the transmission member 22 is coupled with the rod element attachment member 12 by a similar hinge realized by bolt and lug. The rod element attachment member 12 is rigidly connected to the rod element 5 and, thus, enables the transmission of the movement of the transmission member 22, being part of the kinematic unit 13, to the rod element 5.

The axle journal 21 transmits a force between its end that faces towards the transmission member 22 and its end that faces towards the rod element attachment member 12. Depending on the respective steering action, this force is transmitted with differing angles to the rod element 5. The greater this angle, the higher the portion of the lateral force will be in relation to the total transmitted force. In order to make sure that the rod element 5 can exhibit its function even when high lateral forces are acting, according to the invention, the lateral force absorbing mechanism 7 is provided.

In case that a steering movement of the vehicle 2 is effected by the electrically operated steering system 1, a normal force as well as a lateral force acts on the respective wheel 4 from the ground on which the vehicle 2 is moved. The lateral force is transmitted in the reverse direction from the wheel 4 to the rod element 5 through the previously described chain of elements for effecting the steering movement. In the present embodiment, a stabilizing element 14 is provided in the path of the transmitted lateral force from the wheel 4 to the rod element 5 at a position adjacent to the rod element attachment member 12. This stabilizing element 14 is mounted to the rod element 5 immovably in the lateral direction thereof in order to enable the absorption of acting lateral forces.

In the present arrangement, the stabilizing element 14 is formed with a wing shape and comprises two wing elements 15. These wing elements 15 are directed away from each other at an angle of 180° and are tapered along the radial distance in relation to the rod element 5. The wing elements 15 are in contact with the support assembly 8 in order to convey the absorbed lateral force to the support assembly 8. In the present embodiment, the support assembly 8 comprises two guiding members 16 for each side, in particular per wheel 4. The guiding members 16 are located in equivalent positions with respect to the vehicle longitudinal direction 9, however, at different vertical positions. Each guiding member 16 is formed with an open area towards the rod element 5 in order to accommodate the stabilizing element 14 and the wing elements 15, respectively. In this context, accommodate can also be understood as partial protruding of the wing elements 15 into the guiding member 16.

The stabilizing element 14 interacts with the guiding members 16 in such a way that the stabilizing element 14 moves by the shifting path along the rod element longitudinal direction in the guiding member 16 with a shift of the rod element 5, wherein the rod element 5 is immovably coupled to the stabilizing element 14 with respect to the longitudinal direction and wherein the guiding member 16 is immovably attached to the rack 3 in relation to the translational and rotational direction. A relative rotation of the stabilizing element 14 in relation to the guiding member 16, which could be induced due to high lateral forces, is inhibited in an interlocking manner. In this way, the efficient function for transmitting and conveying the lateral force from the rod element 5 into the rack 3 is enhanced. The guiding members 16 are formed with an open area towards the rod element 5 and formed groove-shaped or cavity-shaped. The side contour of the formed groove is structured corresponding to the respective end portion of the wing elements 15 protruding into the groove.

FIG. 2 shows the electrically operated steering system 1 of FIG. 1 in another perspective view, which shows the side of the electrically operated steering system 1 to which the electric machine 6 is attached. The rack 3 comprises a rack wall 303, which connects a bottom rack platform 301 and a top rack platform 302. The rack wall 303 reduces the entry of dirt into the electrically operated steering system 1. The electric machine 6 is centrally arranged between the wheels 4 with respect to the vehicle width direction 10. The electric machine 6 is arranged in the bottom area of the rack 3 in relation to the vertical direction, i.e., in the area of the bottom rack platform 301. A central flange unit 18 is centrally arranged between the wheels 4 in relation to the vehicle width direction 10. The central flange unit 18 is arranged above the rack 3 in the vertical direction and, thus, enables a modular attachment of the electrically operated steering system 1 to the vehicle frame 34 of the vehicle 2. The central flange unit 18 comprises a coupling portion 181 and a pivot member 182. The coupling portion 181 enables, by means of connecting pins 183 such as screws, an attachment of the rack 3 to the vehicle frame 34 of the vehicle 2. The pivot member 182 enables a pivoting movement of the rack 3 about the longitudinal axis of the pivot member 182 in relation to the coupling portion 181. In this way, a movement of the vehicle 2 in relation to the electrically operated steering system 1, in particular while driving on an uneven ground is enabled.

Figure 3:
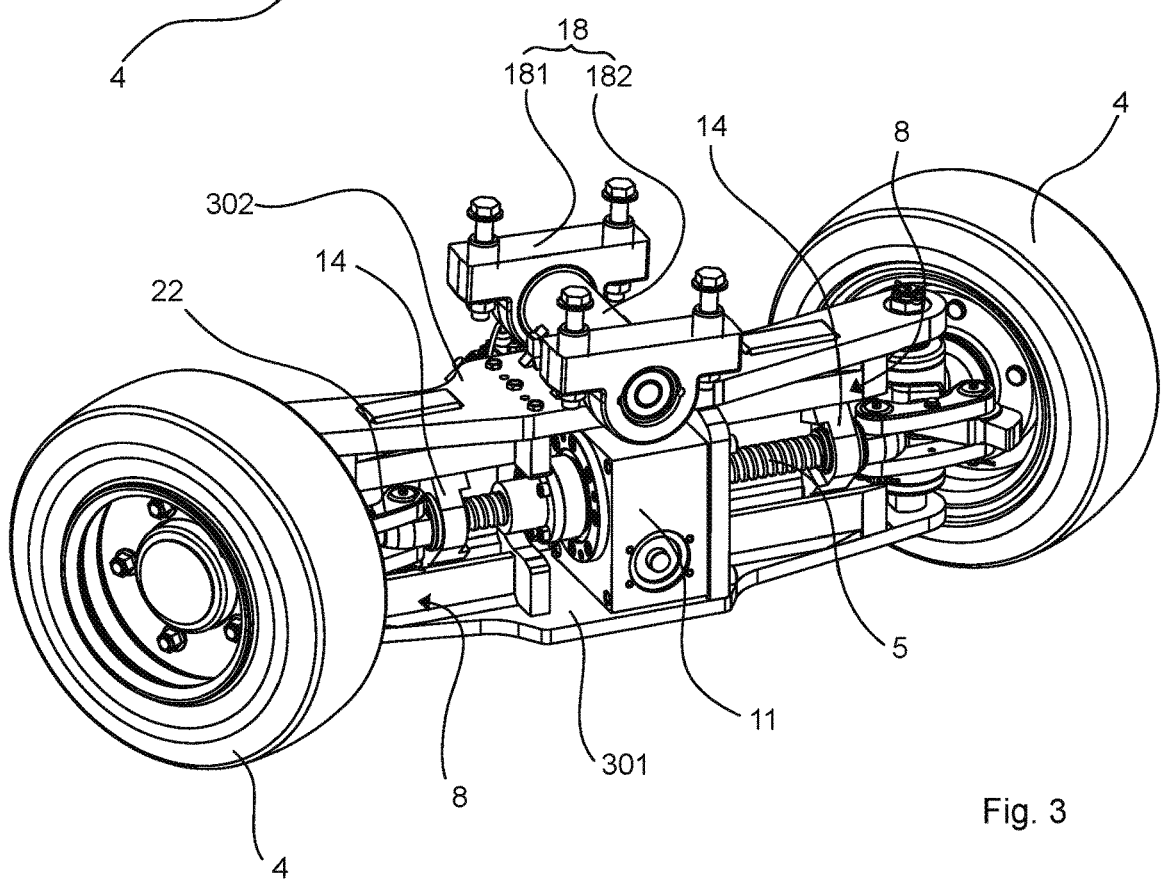
FIG. 3 shows the electrically operated steering system of FIG. 1 with a steered first steering angle.

FIG. 3 shows the electrically operated steering system 1 of FIG. 1 with a steered first steering angle. With the steering angle shown in FIG. 3, the vehicle 2 exhibits a turning movement. In comparison with FIG. 1, FIG. 3 shows the respective stabilizing elements 14 are in the area of the wheels 4 shifted along the vehicle width direction 10 in relation to the support assembly 8. The shift to the right is achieved by a movement of the rod element 5, which, in turn, is effected by the electric machine 6 with an interaction of the conversion mechanism 11.

The shift of the rod element 5 is converted to a rotation, i.e., to a steering rotation of the wheels 4, by means of the kinematic unit 13. This rotation has the effect that the angle between the left transmission member 22 in FIG. 3 and the rod element 5 is increased. The force produced by the transmission member 22 includes a higher portion of a lateral force. In order to compensate for this lateral force, the lateral force absorbing mechanism 7 is arranged in the area of the rod element 5 in order to absorb the lateral force and convey the same into the rack 3. In the present case, the wing shaped stabilizing element 14 is provided between the support assembly 8 of the lateral force absorbing mechanism 7 and the rod element 5.

Figure 4:
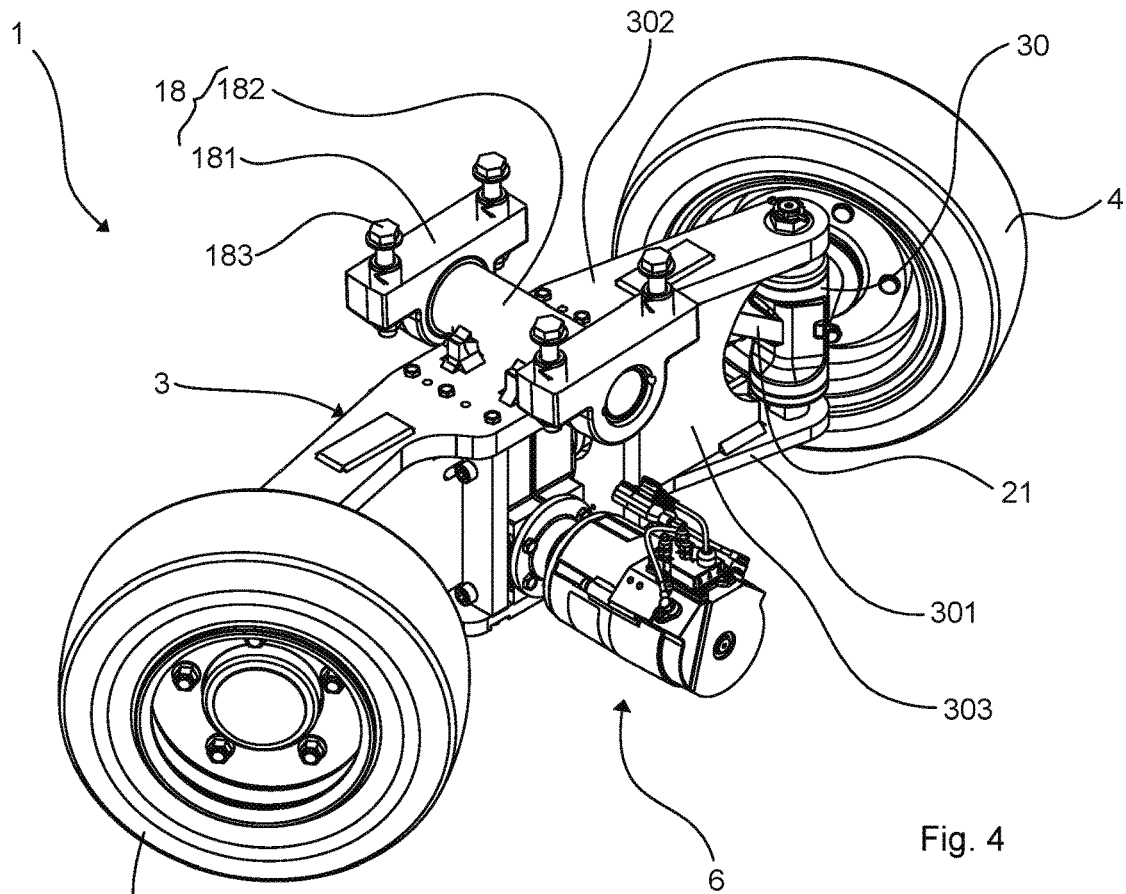
FIG. 4 shows the electrically operated steering system of FIG. 3 in another perspective view.

FIG. 4 shows the electrically operated steering system 1 with the steered steering angle of FIG. 3 in another perspective view, which shows the side of the electrically operated steering system 1 to which the electric machine 6 is attached. As can be seen at the wheel 4 on the right side in FIG. 4, the axle journal 21 is connected to a wheel carrier 30 of the wheel 4. As an alternative, the axle journal 21 may also be provided as single part with the wheel carrier 30. The electric machine 6 is mounted to the rack 3, as also shown in FIG. 2.

Figure 5:
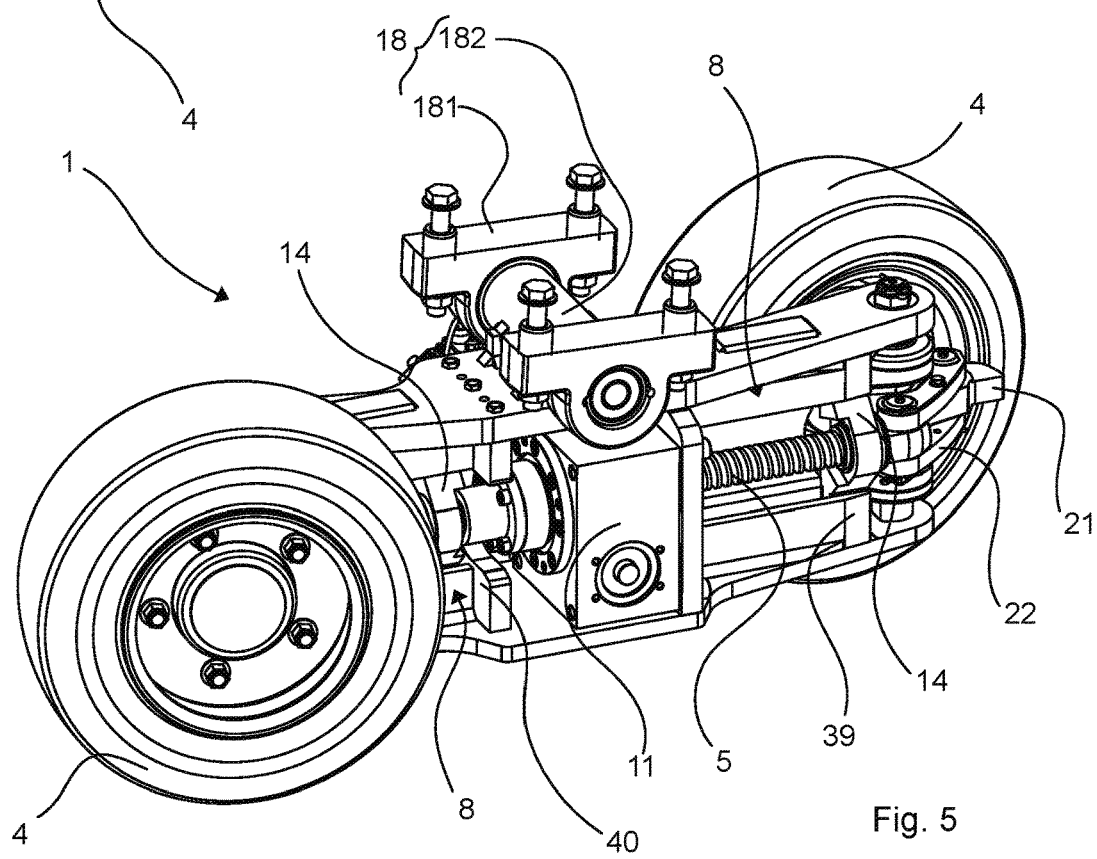
FIG. 5 shows the electrically operated steering system of FIG. 1 with a steered zero turn steering angle.

FIG. 5 shows the electrically operated steering system 1 of FIG. 1 with a zero steering angle. At the steering angle shown in FIG. 5, the vehicle 2, which is equipped with a non-steerable axle and with a steerable axle provided with the electrically operated steering system 1, turns about a point, which is located on or near an axis that connects the wheels 37 (see FIG. 20). Preferably, the central point is located centrally on the axis that connects the wheels 37. In this way, the vehicle 2 exhibits an exclusive rotation with respect to the axis connecting the wheels 37 of the non-steerable axle without a movement in the forward direction, and a zero turn is realized. With a zero turn, the lateral forces acting on the rod element 5 are at a maximum. The axle journal 21 is directed in the longitudinal direction of the rod element 5. The distance between the rod element 5 and the axle journal 21 in a direction perpendicular to the rod element 5 is bridged by the transmission member 22, which is hingedly supported on both sides. Due to the hingedly supported arrangement, the transmission member 22 is adapted to transmit a force and not to transmit a torque or a moment. This force is distributed into a lateral force and a normal force on the rod element 5. The higher the angle between the transmission member 22 and the rod element 5, i.e., the higher the steering angle, the higher the portion of the lateral force is in relation to the normal force. In a zero turn situation, the portion of the lateral force is consequently at a maximum value.

According to the invention, the lateral force absorbing mechanism 7 is arranged in the rack 3. In this way, even at maximum transmission of lateral forces to the rod element 5, a sufficient stabilization of the rod element 5 is realized in order to ensure a reliable operation of the electrically operated steering system 1. At the zero turn steering angle, as shown in FIG. 5, the respective stabilizing elements 14 are, in comparison with the situations of FIGS. 3 and 4, in the area of the wheels 4 shifted along the vehicle width direction 10 in relation to the support assembly 8 to the right side of FIG. 3. The stabilizing element 14 shown on the right side in FIG. 5 is shifted up to an outer position facing towards the wheel 4. This position may include an outer stopper 39. The maximum steering angle, i.e., a zero turn steering angle, is achieved if the right stabilizing element 14 is located at the outer stopper 39. The stabilizing element 14 shown on the left side in FIG. 5 is shifted up to an inner stopper 40 facing towards the conversion mechanism 11. If the stabilizing element 14 is located at the inner stopper 40, in the same way, the maximum steering angle, i.e., a zero turn steering angle, is achieved. It is possible to arrange only one of the outer stopper 39 or the inner stopper 40 in order to simplify the arrangement.

Figure 6:
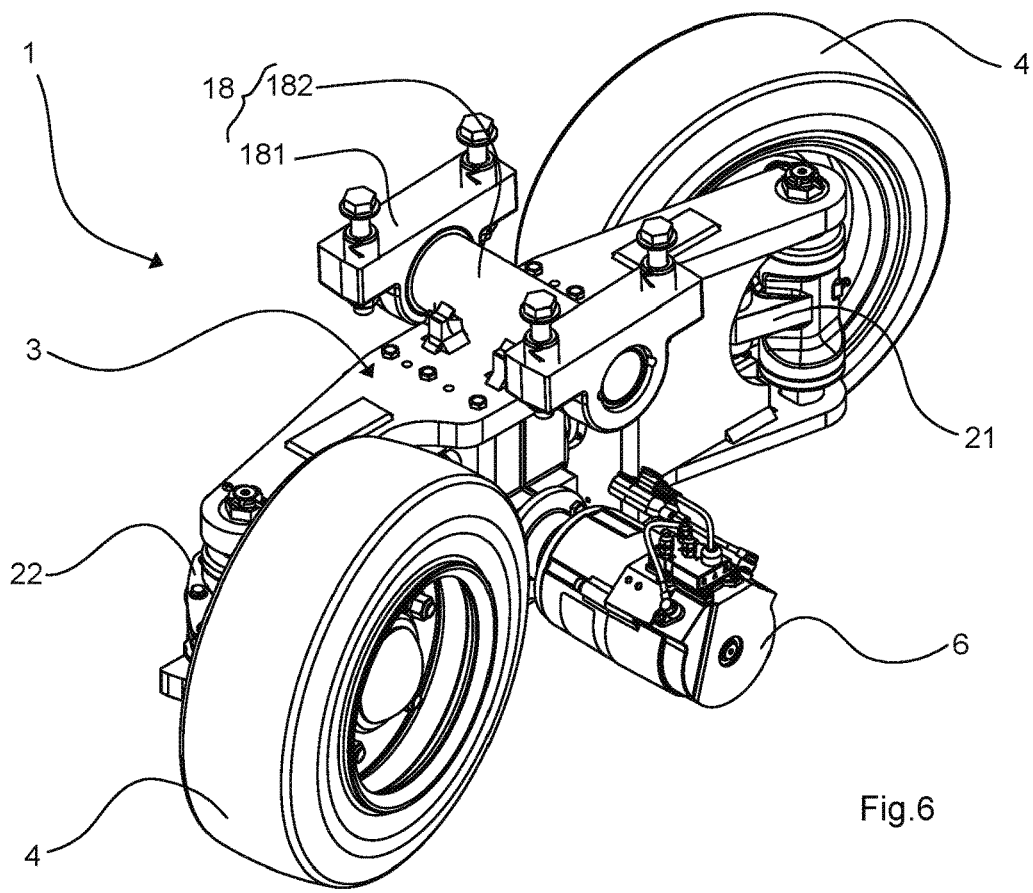
FIG. 6 shows the electrically operated steering system of FIG. 5 in another perspective view.

FIG. 6 shows the electrically operated steering system 1 with the steered steering angle of FIG. 5 in another perspective view, which shows the side of the electrically operated steering system 1 to which the electric machine 6 is attached. As can be seen at the wheel 4 on the right side of FIG. 6, the axle journal 21 is aligned substantially along the axis defined by the rod element 5, which is along the rack 3. The transmission member 22 can be seen at the wheel 4, which is shown on the left side in FIG. 6, wherein the transmission member 22 bridges the distance between the axle journal 21 and the rod element 5, as explained in connection with FIG. 5.

Figure 7:
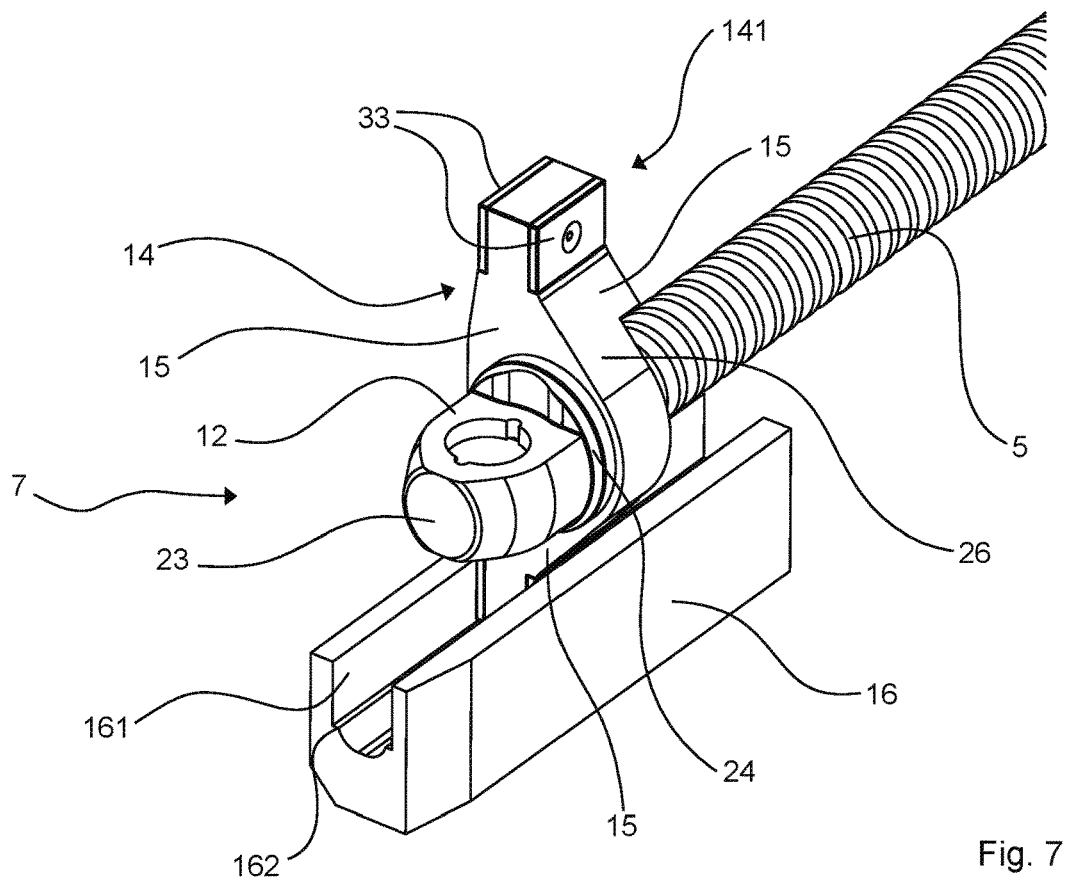
FIG. 7 shows the lateral force absorbing mechanism used in the embodiment of FIG. 1 in a detailed perspective view.

FIG. 7 shows the components according to the first embodiment that are involved in conveying the lateral force from the rod element 5 to the rack 3. The stabilizing element 14 is arranged between the rod element 5 and the support assembly 8 of the lateral force absorbing mechanism 7. For clarity, only the lower part of the support assembly 8, in particular one guiding member 16, is illustrated. The guiding member 16 according to the first embodiment has an open section towards the stabilizing element 14, in which an outer portion 141 of the stabilizing element 14 is guided along the longitudinal direction of the rod element 5, such that a rotational movement of the outer portion 141 about the longitudinal direction of the rod element 5 is restricted by the respective guiding member 16. The stabilizing element 14 is moved along the guiding member 16 upon a steering movement.

In order to minimize friction upon this movement, a slide coating 33 is attached to the outer portion 141 of the stabilizing element 14. The slide coating 33 is provided at both sides of the outer portion 141. The guiding member 16 comprises two sliding surfaces 161 at two sides facing towards the slide coating 33. These sliding surfaces 161 further minimize the frictional losses upon a sliding movement caused by a steering action. In the case that a lateral force is transmitted from the transmission member 22 through the rod element attachment member 12 to the rod element 5 and further through the stabilizing element 14 to the guiding member 16, the sliding surfaces 161 as well as a guiding member shoulder 162 are arranged to serve as mated surfaces between the stabilizing element 14 and the guiding member 16. The stabilizing element 14 has two wing elements 15 facing towards the respective guiding member 16, which taper towards the outer direction, that is, towards the guiding members 16.

The rod element attachment member 12 according to FIG. 7 may be integrated in each embodiment of the present invention. The rod element attachment member 12 comprises a lug portion 23 at an end of the rod element attachment member 12, which faces towards the wheel 4, a shoulder portion 24, and a cylinder portion. The lug portion 23 ensures a hinged connection to the transmission member 22. The shoulder portion 24 serves as stop element for the stabilizing element 14 in order to stop the stabilizing element 14 at the end portion of the rod element 5. The stabilizing element 14 is fixed to the cylinder portion. In order to achieve this, a press fit and/or a fixed attachment of the stabilizing element 14 using a snap ring are possible connecting options. The stabilizing element 14 comprises a central region 26 and two radial outer portions 141. The central region 26 comprises a central bore that is mounted on the cylinder portion of the rod element attachment member 12 without play. The central region 26 is formed similar to a rhomb shape. The lug portion 23 is connected to the transmission member 22 such that a rotation of the rod element 5 which is connected to the lug portion 23 is prevented.

Figure 8:
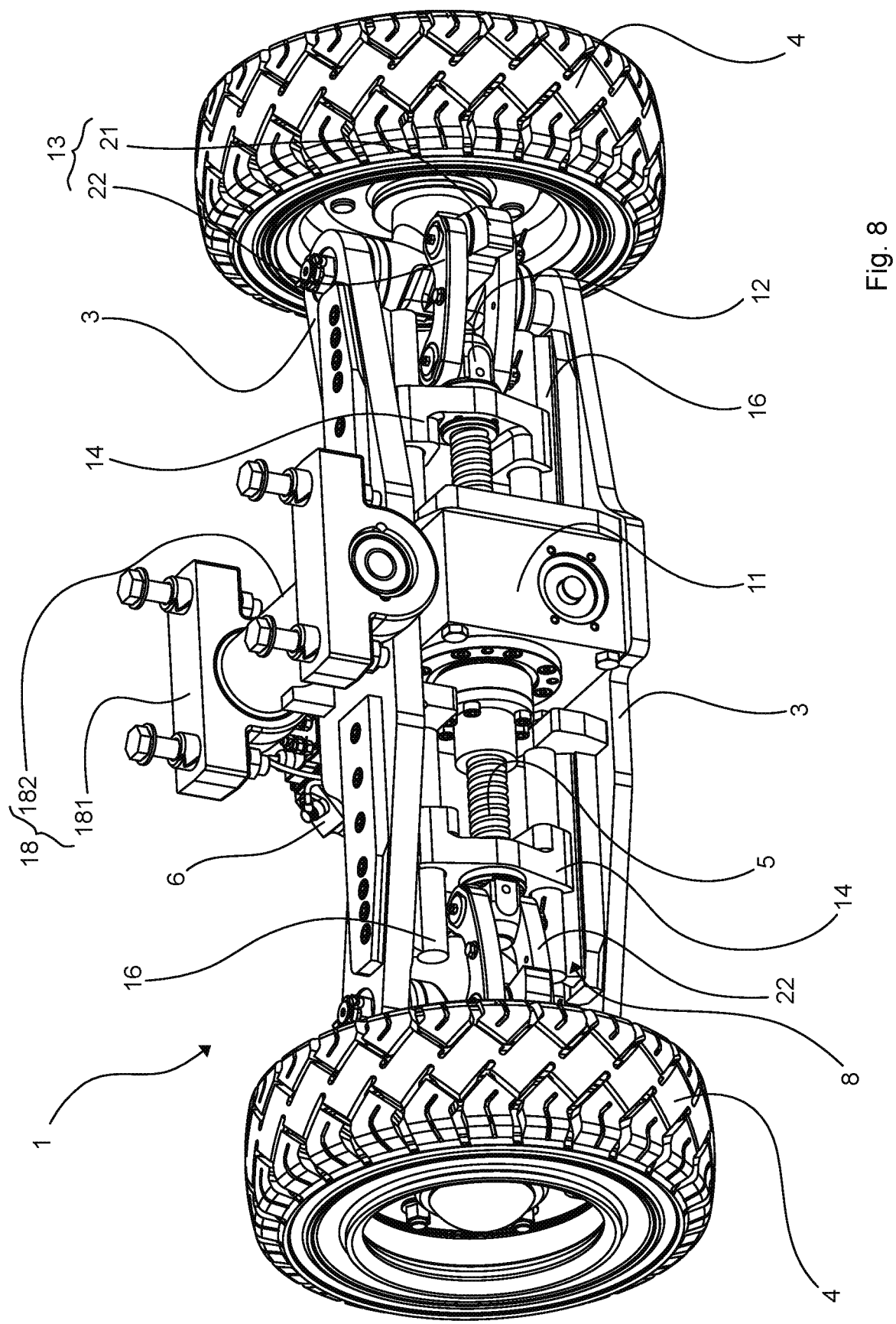
FIG. 8 shows a perspective view of an electrically operated steering system according to a second embodiment.

A second embodiment of the electrically operated steering system 1 is shown in FIGS. 8 to 14. Similar to FIG. 1, the electrically operated steering system 1 is shown in FIG. 8 without a steered steering angle, that is in a straight forward driving situation. The single components and functions thereof have already been explained in connection with the first embodiment. Therefore, mainly the differences between these individual embodiments will be addressed.

The embodiment according to FIG. 8 differs from the embodiment of FIG. 1 in that the guiding members 16 of the support assembly 8 are at least partially formed with a circular cross section. In view of this arrangement, the stabilizing element 14 and, in particular, the wing elements 15, include a guiding bore 17, which is aligned in parallel with respect to the rod element 5, in an end that faces away from the rod element 5. The guiding bore 17 is explained in greater detail with reference to FIG. 14. With respect to the arrangement of the stabilizing element 14 and the function thereof in the path of the lateral force, the embodiment of FIG. 8 corresponds to the embodiment of FIG. 1. In the present arrangement, four guiding members 16 with partially circular cross sections are provided, each of which is aligned in parallel to the rod element 5. Two guiding members 16 are provided for each wheel 4, wherein one of the two guiding members 16 is provided above the rod element 5 and the other is provided below the rod element 5. The diameter of the guiding members 16 is smaller than the diameter of the rod element 5. It is also possible to arrange the respective guiding members 16 without interruption, such that the electrically operated steering system 1 comprises two guiding members 16 in total, instead of four guiding members 16.

Figure 9:
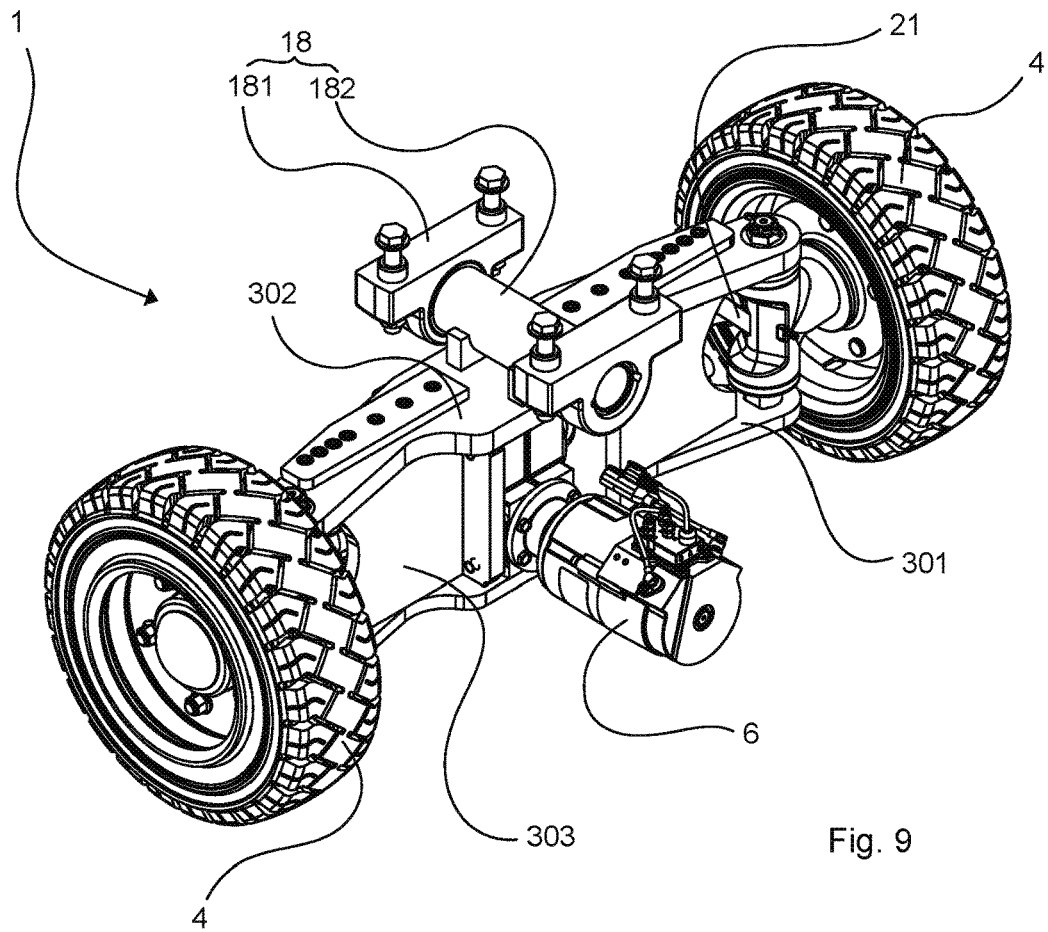
FIG. 9 shows the electrically operated steering system of FIG. 8 in another perspective view.

FIG. 9 shows the electrically operated steering system 1 of FIG. 8 in another perspective, which shows the side of the electrically operated steering system 1 to which the electric machine 6 is attached. The electric machine 6 is centrally arranged with respect to the vehicle width direction 10 between the two wheels 4. The electric machine 6 is arranged in the lower area of the rack 3 with respect to the vertical direction, in particular in the area of the bottom rack platform 301. With the position of the wheel according to FIG. 9, the axle journal 21 is aligned substantially perpendicular to the rod element 5.

Figure 10:
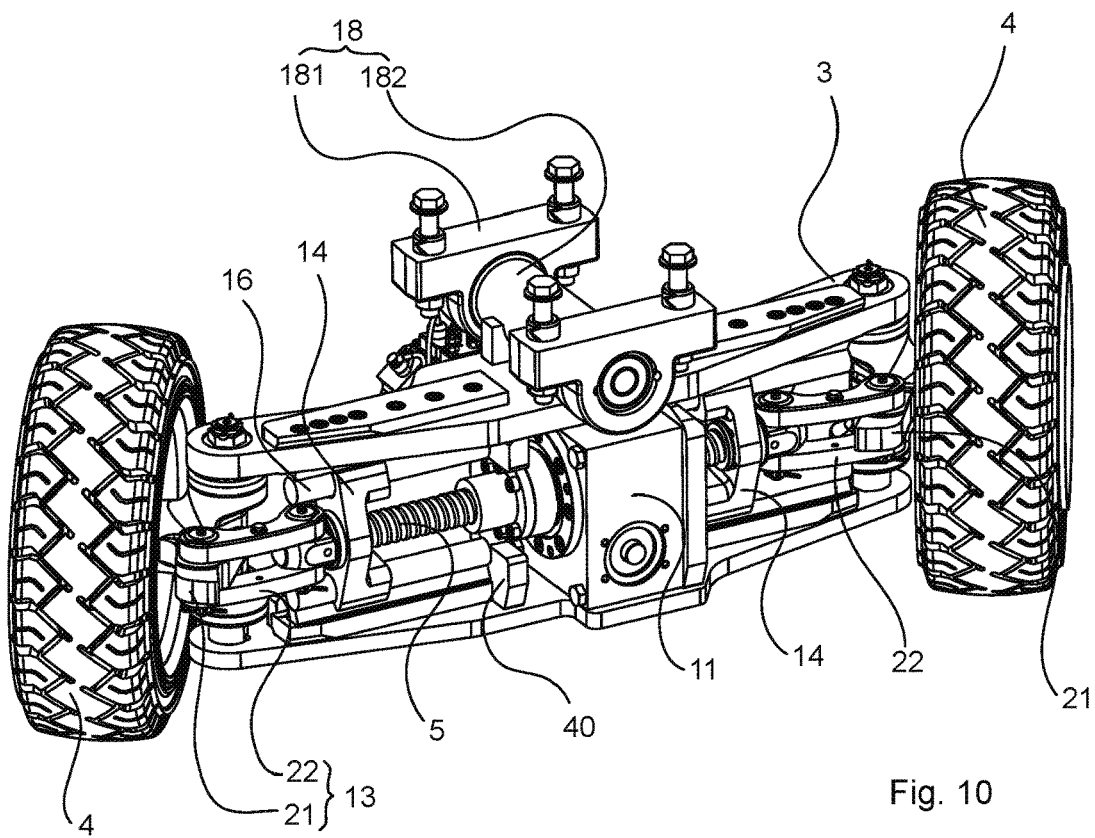
FIG. 10 shows the electrically operated steering system of FIG. 8 with a steered second steering angle.

FIG. 10 shows the electrically operated steering system 1 of FIG. 8 with a steered second steering angle. With the steering angle according to FIG. 10, the vehicle 2 implements a turn. In comparison with FIG. 8, the corresponding stabilizing elements 14 in the view of FIG. 10 are, in the area of the single wheels 4, shifted to the left in position along the vehicle width direction 10 in relation to the support assembly 8. The shift to the left is effected by the rod element 5, which is operated by the electric machine 6 with an interaction of the conversion mechanism 11. The shift of the rod element 5 is converted by the kinematic unit 13 into a rotation, in particular a steering rotation, of the wheels 4. This rotation has the effect that the angle between the right transmission member 22 in FIG. 10 and the rod element 5 is increased. The force that is produced by the transmission member 22 comprises a higher level force component compared to a steering angle for a straight forward operation. In order to compensate this lateral force component, the lateral force absorbing mechanism 7 is provided in the area of the rod element 5 in order to absorb the lateral force and convey the same into the rack 3. In the present arrangement, the wing-shaped stabilizing element 14 is attached between the support assembly 8 of the lateral force absorbing mechanism 7 and the rod element 5.

Figure 11:
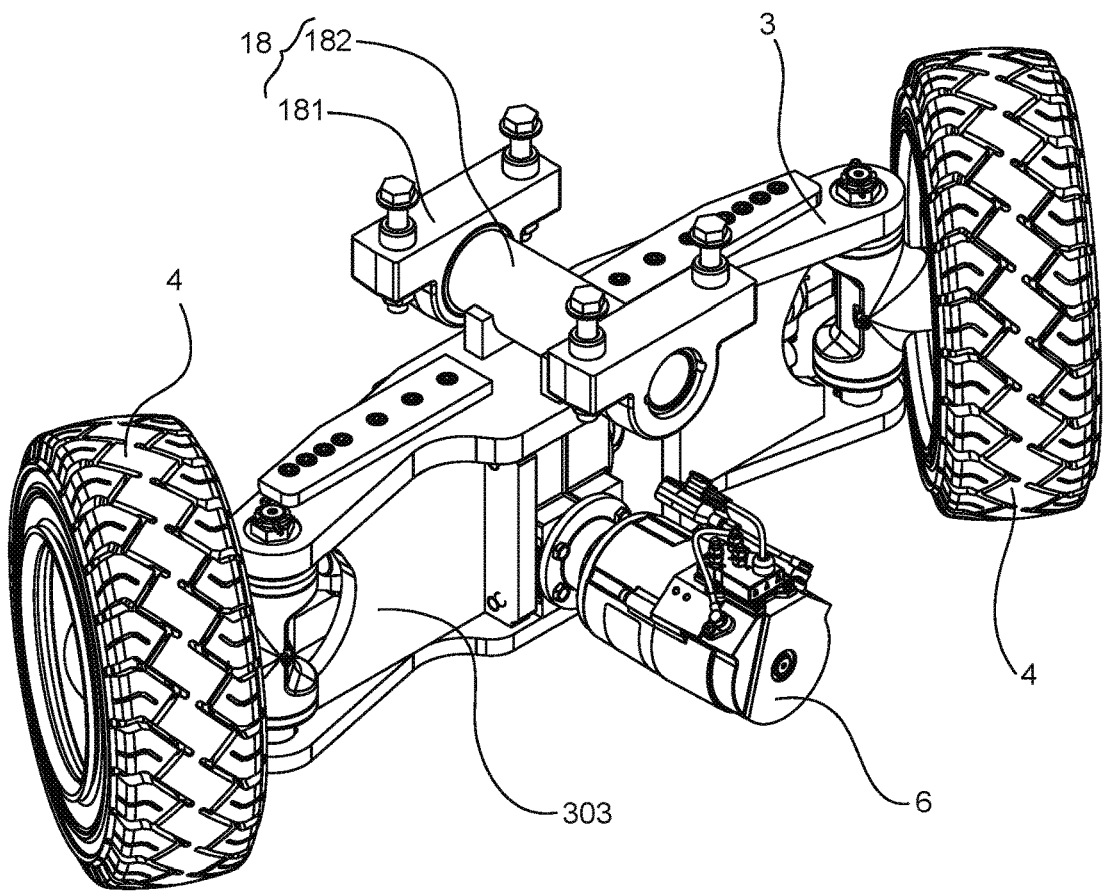
FIG. 11 shows the electrically operated steering system of FIG. 10 in another perspective view.
Figure 12:
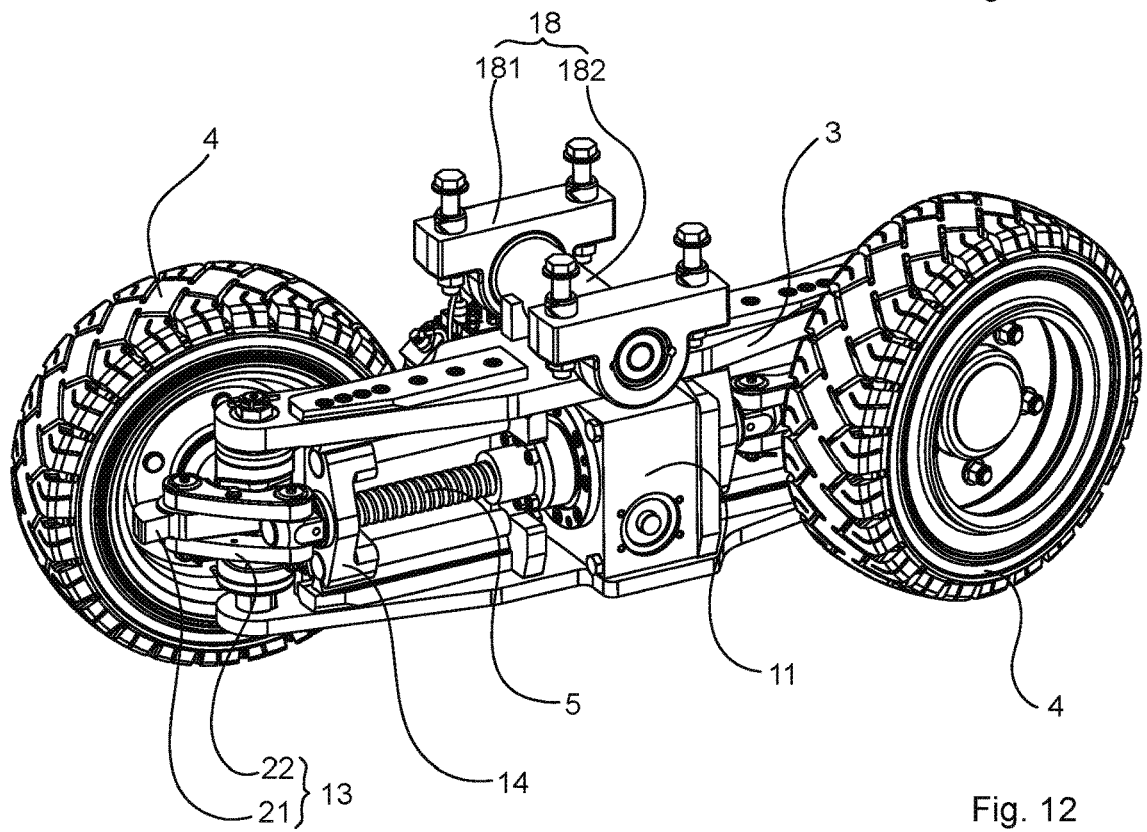
FIG. 12 shows the electrically operated steering system of FIG. 8 with a steered zero turn steering angle.

FIG. 11 shows the electrically operated steering system 1 with the steered steering angle of FIG. 10 in another perspective, and FIG. 12 shows the electrically operated steering system 1 of FIG. 8 with a zero turn steering angle. The individual components of the electrically operated steering system 1 are explained based on the previously described Figures and are not again explained in the context of FIG. 11 and FIG. 12. In the steering angle shown in FIG. 12, the vehicle 2, which is equipped with a non-steerable axle and a steerable axle provided with the electrically operated steering system 1, turns about a point that is positioned on an axis that connects the wheels 37 (see FIG. 20). Preferably, this point is located centrally on the axis that connects the wheels 37. In this way, the vehicle 2 exhibits a pure rotatory movement in relation to the axis connecting the wheels 37 of the non-steerable axle without any forward movement, and a zero turn functionality is realized. With this zero turn functionality, the lateral forces acting on the rod element 5 are at a maximum. In this case, the axle journal 21 is aligned in relation to the rod element 5 in the longitudinal direction thereof. The distance between the rod element 5 and the axle journal 21 in a perpendicular direction to the rod element 5 is bridged by the transmission member 22, which is hingedly supported on both sides. The transmission member 22 is adapted, due to the hinged support, to transmit a force and not to transmit a torque. This force is distributed into a lateral force and a normal force on the rod element 5. The higher the angle between the transmission member 22 and the rod element 5, i.e., the higher the steered steering angle, the higher the portion of the lateral force is in relation to the normal force. At a zero turn steering angle, the portion of the lateral force is, thus, at a maximum. According to the invention, the lateral force absorbing mechanism 7 is arranged in the electrically operated steering system 1. In this way, even if the lateral force conveyed to the rod element 5 is at a maximum, a sufficient stabilization of the rod element 5 is realized in order to ensure reliable operation of the electrically operated steering system 1.

Figure 13:
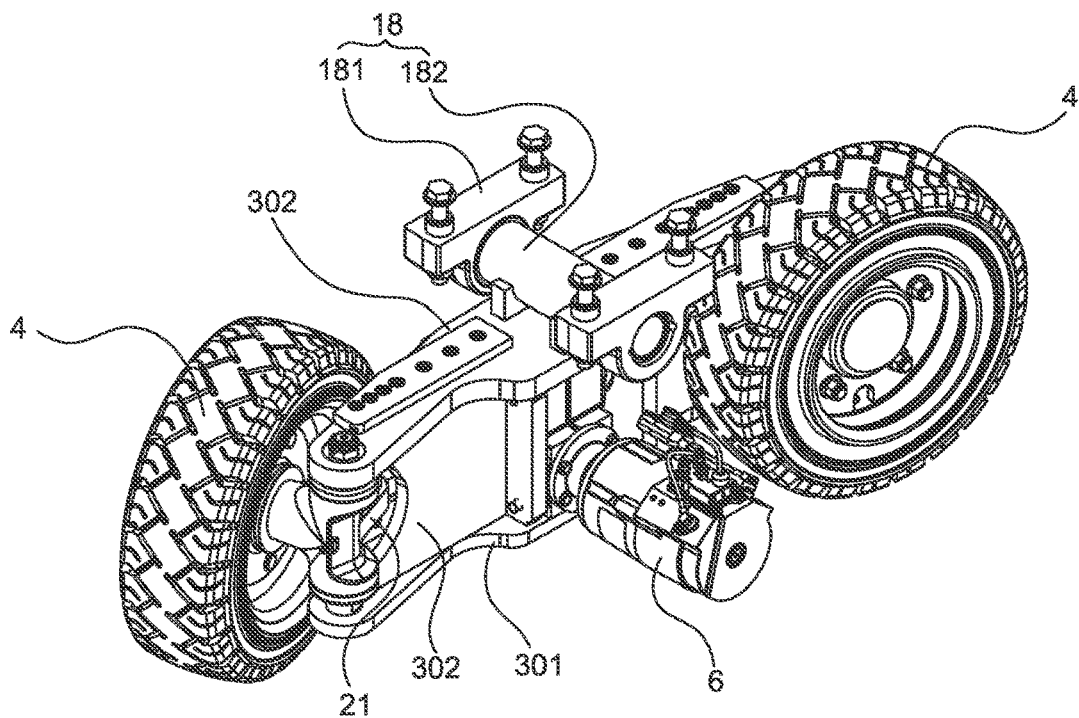
FIG. 13 shows the electrically operated steering system of FIG. 12 in another perspective view.

FIG. 13 shows the electrically operated steering system 1 with the steered steering angle of FIG. 12 in another perspective which shows the side of the electrically operated steering system 1 to which the electric machine 6 is attached. The electric machine 6 is arranged centrally in the area of the bottom rack platform 301. The electric machine 6 is dimensioned such that even at a zero turn steering angle, a sufficient distance between the electric machine 6 and the respective wheel 4 remains.

Figure 14:
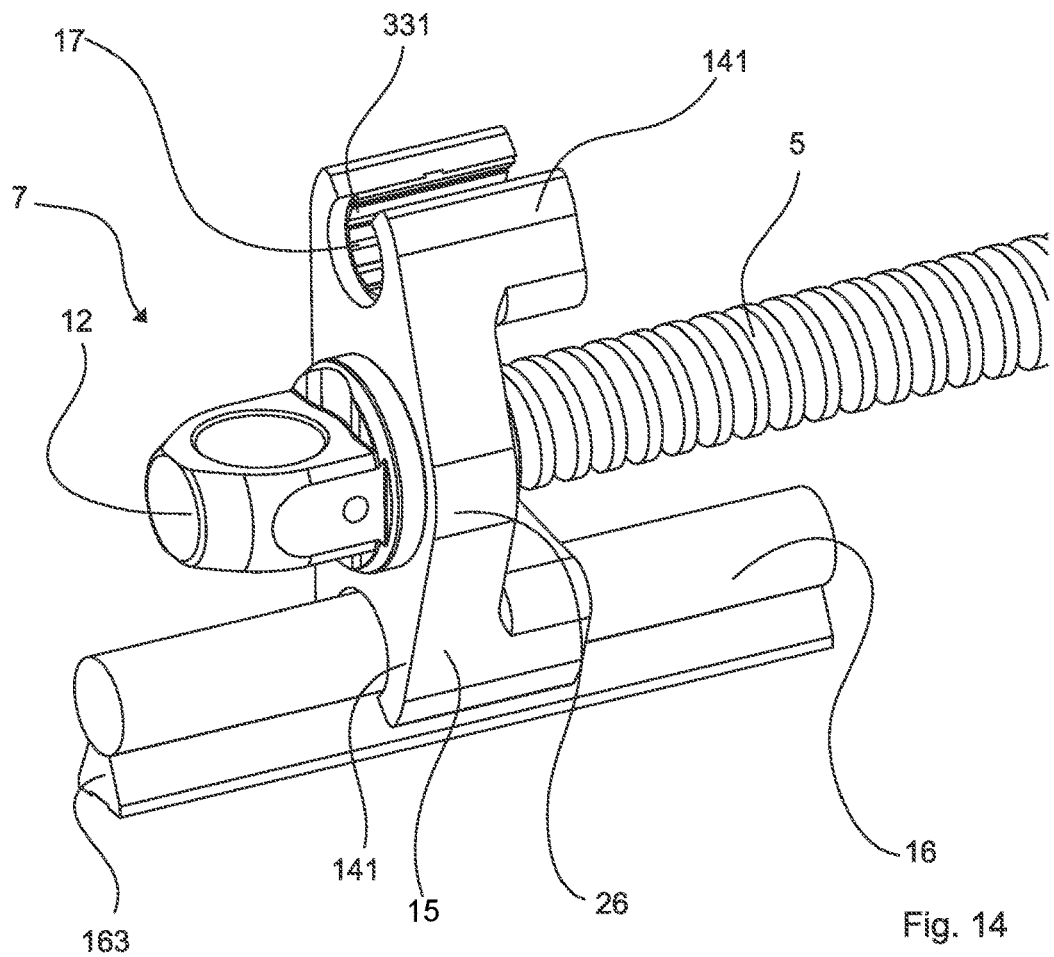
FIG. 14 shows a lateral force absorbing mechanism used in the embodiment of FIG. 8 in a detailed perspective view.

FIG. 14 illustrates the components involved with conveying the lateral force from the rod element 5 to the rack 3 according to the second embodiment. The stabilizing element 14 is arranged between the rod element 5 and the support assembly 8 of the lateral force adsorbing mechanism 7. For clarity, only the lower portion of the support assembly 8, that is, one guiding member 16, is shown. The guiding member 16 according to the present embodiment has a circular cross section that is positioned on a guiding member base 163. The guiding bore 17 is arranged in the stabilizing element 14. This guiding bore 17 is substantially C-shaped in the present example and is open to the outside in relation to the rod element 5. The guiding bore 17 is configured to guide the stabilizing element 14 along the longitudinal direction of the rod element 5. The guiding member 16 according to the present embodiment is aligned through the guiding bore 17 of the stabilizing element 14 in such a way that a rotational movement of the stabilizing element 14 about the longitudinal direction of the rod element 5 is restricted by the respective guiding member 16.

Upon a steering movement, the stabilizing element 14 is moved along the guiding member 16. In order to minimize friction upon this movement, a slide bushing 331 is attached to the guiding bore 17. This slide bushing 331 is provided with a slit such that the slide bushing 331 is adapted to the guide bore 17, which is open to the outer region. The portion of the guiding bore 17 that is open to the outer region is capable of transmitting a force to the guiding member base 163 when a lateral force is transmitted from the transmission member 22 to the rod element 5 through the stabilizing element 14, and to the guiding member 16, and, thus, serves as a mating surface element between the stabilizing element 14 and the guiding member 16. The stabilizing element 14 comprises two wing elements 15 that are each facing towards a respective guiding member 16, wherein the wing elements 15 taper towards the outer region, that is, towards the guiding members 16.

The two outer portions 141 are formed as continuous elements from the central region 26. The outer portions 141 are formed longer than the central region 26 with respect to the longitudinal direction of the rod element 5. In this way, a sufficient surface area in the guiding bores 17 is provided in order to convey the lateral force introduced to the rod element 5 on to the guiding member 16. The outer portions 141 taper towards the outer region. In this way, the stabilizing element 14 has a cross section that is approximately rhomb shaped.

A third embodiment is shown in FIGS. 15 to 19. In this embodiment, the rod element 5 as well as the corresponding lateral force absorbing mechanism 7 are positioned above the central flange unit 18. As a consequence, an empty space is provided between the wheels 4. The dynamic stability of the electrically operated steering system 1 is increased in the present embodiment due to the fact that the steering rotation of the wheels 4 is effected above each respective wheel 4. In the same way, the rack 3 is arranged above the wheels 4. In this example, the support assembly 8 is arranged in the rack 3 with a C- or U-shape along the rod element 5. The support assembly 8 comprises two portions on the respective side of the wheel 4, wherein each portion comprises two frame wings 28 and a frame base 29. The shifting movement effected by the rod element 5 is converted into a rotation by the kinematic unit 13, which comprises the axle journal 21 and the transmission member 22, as previously explained in connection with the preceding embodiments. The rotation is transmitted through the wheel carrier 30 to the respective wheels 4. In the present example, the wheel carrier 30 has an L-shape. A rotary encoder 31 is arranged along the steering axis 19 in order to detect the rotational angle of the wheel 4 and to transmit the same to a controller. In the present example, the electric machine 6 is arranged above the rod element 5. The conversion mechanism 11 between the electric machine 6 and the rod element 5 is embodied as chain transmission in the present example.

Figure 15:
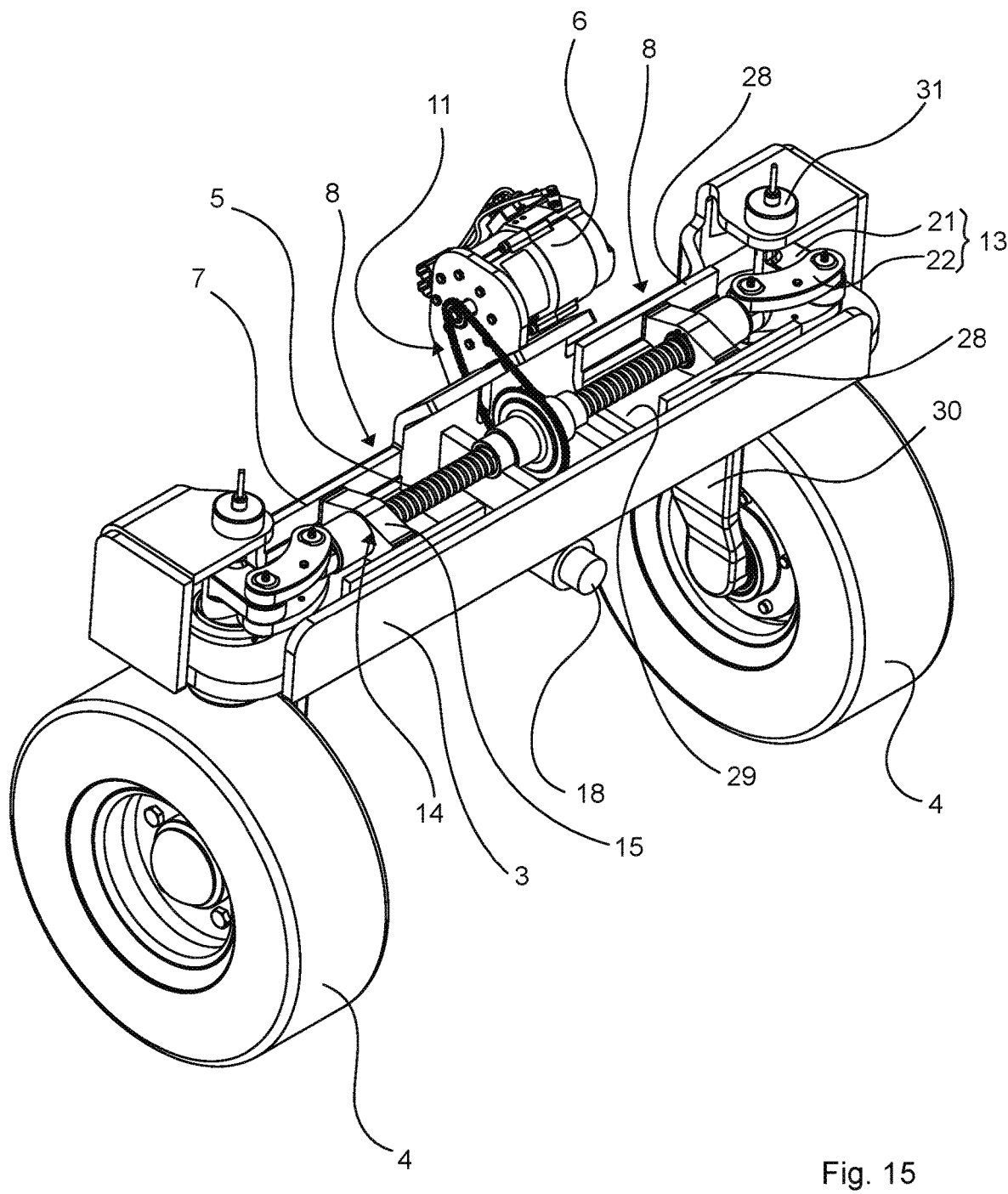
FIG. 15 shows a perspective view of an electrically operated steering system according to a third embodiment.
Figure 16:
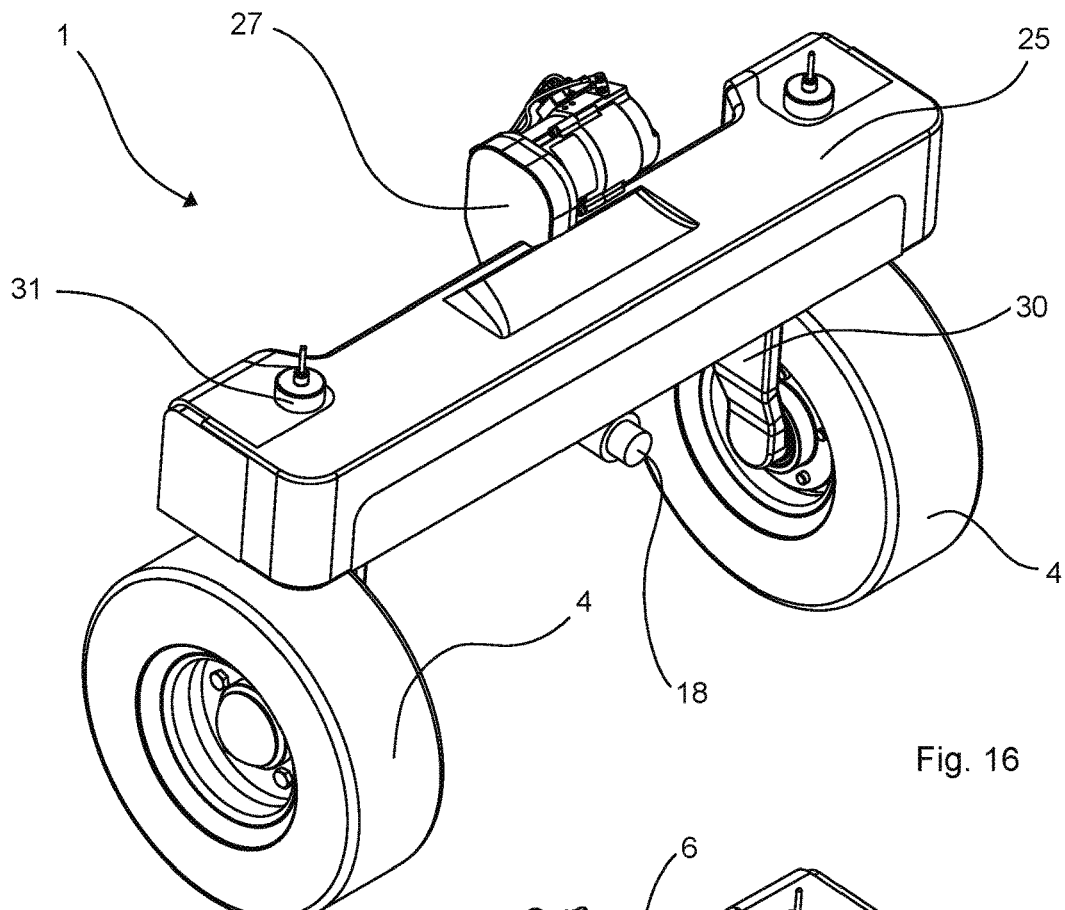
FIG. 16 shows the electrically operated steering system of FIG. 15 with a closed housing.

FIG. 16 shows the electrically operated steering system 1 of FIG. 15 with a housing 25 mounted thereto. In this way, the mechanism according to the invention is protected from entry of dirt. Furthermore, in the present example, the conversion mechanism 11 includes a chain protection assembly in order to enhance the reliability of the mechanical connection between the electric machine 6 and the rod element 5. The additional components of FIG. 16 are already explained in connection with the preceding Figures, and this explanation is also applicable to the present embodiment.

Figure 17:
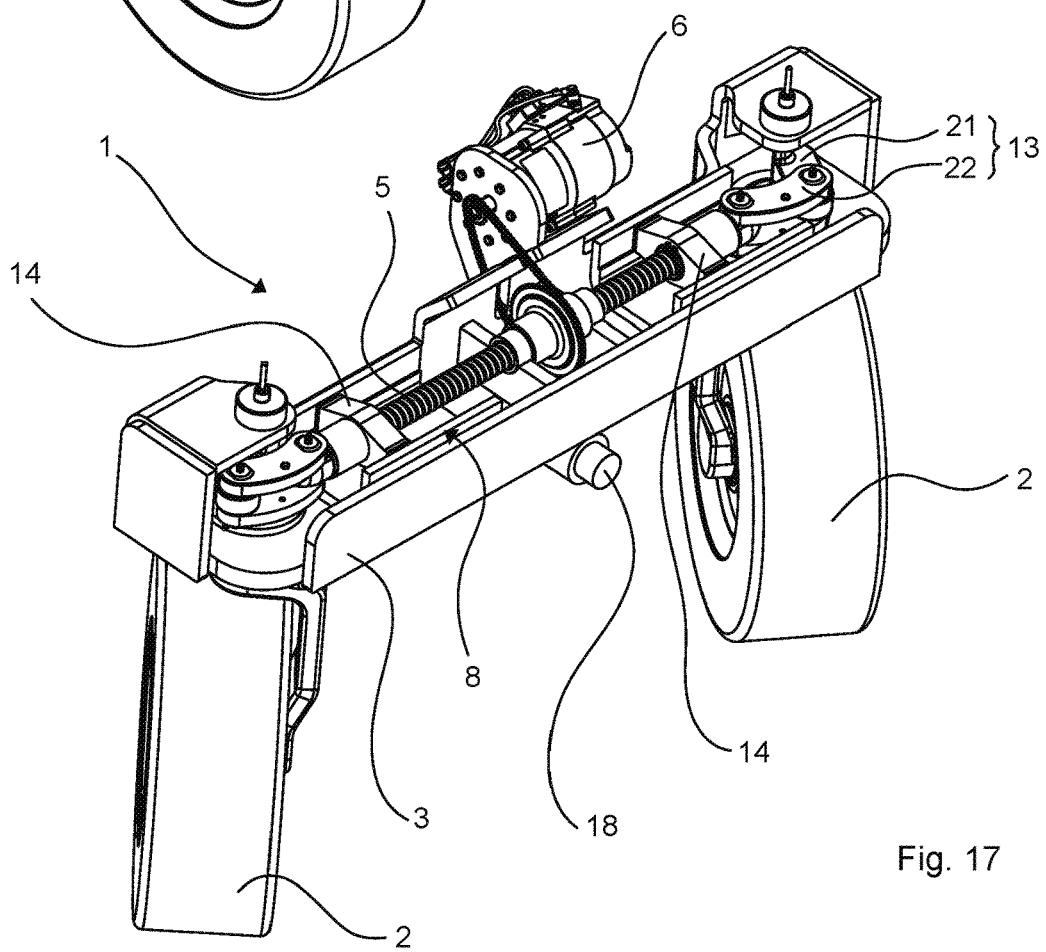
FIG. 17 shows the electrically operated steering system of FIG. 15 with a steered third steering angle.

FIG. 17 illustrates the electrically operated steering system 1 of FIG. 15 with a steered third steering angle. With the steering angle as illustrated in FIG. 17, the vehicle 2 implements a turn. In comparison with FIG. 15, the corresponding stabilizing elements 14 in the view of FIG. 15 are shifted to the left side in relation to the portions of the support assembly 8 in the vehicle width direction 10 in the area of the respective wheels 4. The shift to the left side is effected by the rod element 5, which is driven by the electric machine 6 with an interaction of the conversion mechanism 11. The shift of the rod element 5 is converted into a rotation, that is, into a steering rotation of the wheels 4, by the kinematic unit 13. This rotation has the effect that the angle between the transmission member 22 on the right side in FIG. 17 and the rod element 5 is increased. The force that acts from the transmission member 22, thus, comprises a greater lateral force component. In order to compensate this lateral force component, the lateral force absorbing mechanism 7 is arranged in the area of the rod element 5 in order to absorb the lateral force and convey the same to the rack 3. In the present example, the wing shaped stabilizing element 14 is attached between the support assembly 8 and the rod element 5.

Figure 18:
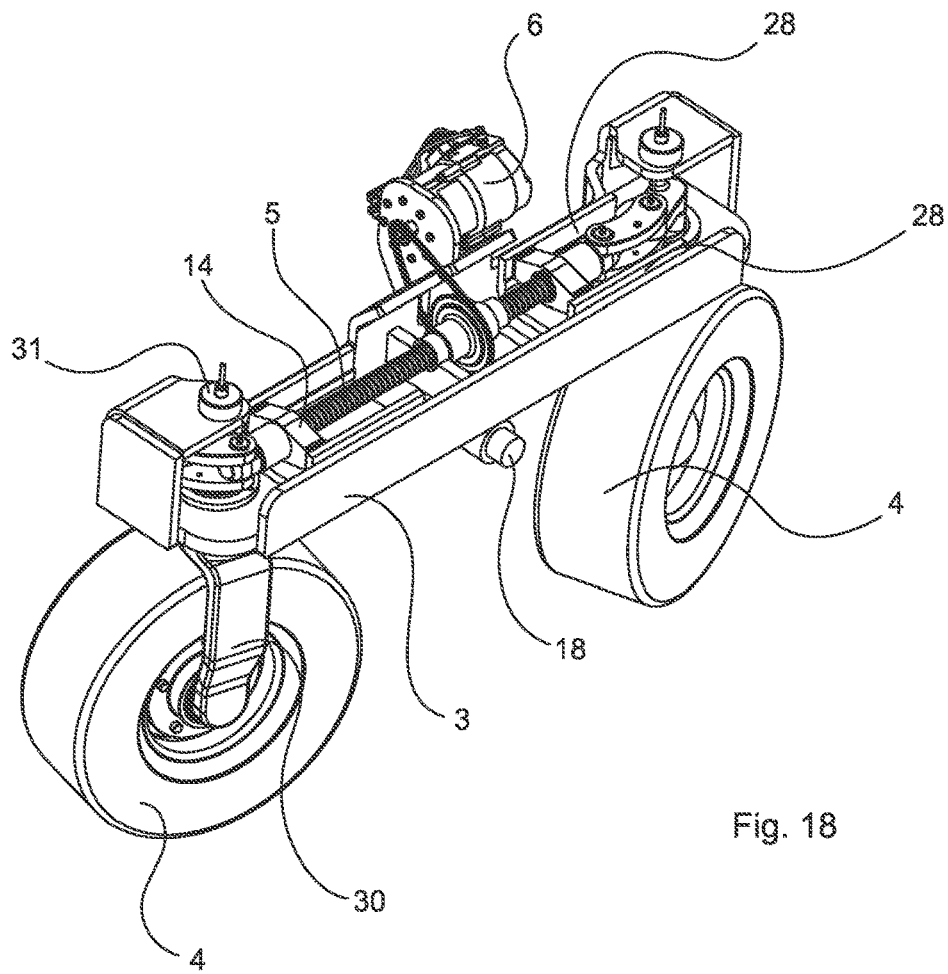
FIG. 18 shows the electrically operated steering system of FIG. 15 with a steered zero turn steering angle.

FIG. 18 illustrates the electrically operated steering system 1 of FIG. 15 with a zero turn steering angle. With the steering angle illustrated in FIG. 18, the vehicle 2, which is provided with a non-steerable axle and a steerable axle comprising the electrically operated steering system 1, rotates about a point positioned on an axis, which connects the wheels 37 (see FIG. 20). Preferably, this point is positioned centrally on the axis that connects the wheels 37. In this way, the vehicle 2 performs a pure rotation without moving in the forward direction in relation to the axis that connects the wheels 37 of the non-steerable axle, and a zero turn functionality is realized. At a zero turn steering angle, the lateral forces acting on the rod element 5 reach a maximum value. The axle journal 21 is aligned to the rod element 5 in its longitudinal direction in this situation. The distance perpendicular to the rod element 5 between the rod element 5 and the axle journal 21 is bridged by the transmission member 22, which is hingedly supported on both sides. Due to the hinged support, the transmission member 22 is adapted to transmit a force and is not capable of transmitting a torque or a moment. The force is divided into a lateral force and a normal force on the rod element 5. The higher the angle between the transmission member 22 and the rod element 5, in particular, the greater the steered steering angle, the higher the portion of the lateral force is in relation to the normal force. Consequently, at a zero turn steering angle, the portion of the lateral force reaches a maximum value. According to the invention, the lateral force absorbing mechanism 7 is arranged in the electrically operated steering system 1. In this way, a sufficient stabilization of the rod element 5 is realized in order to ensure reliable operation of the electrically operated steering system 1, even if the introduction of lateral forces to the rod element 5 reaches the maximum.

Figure 19:
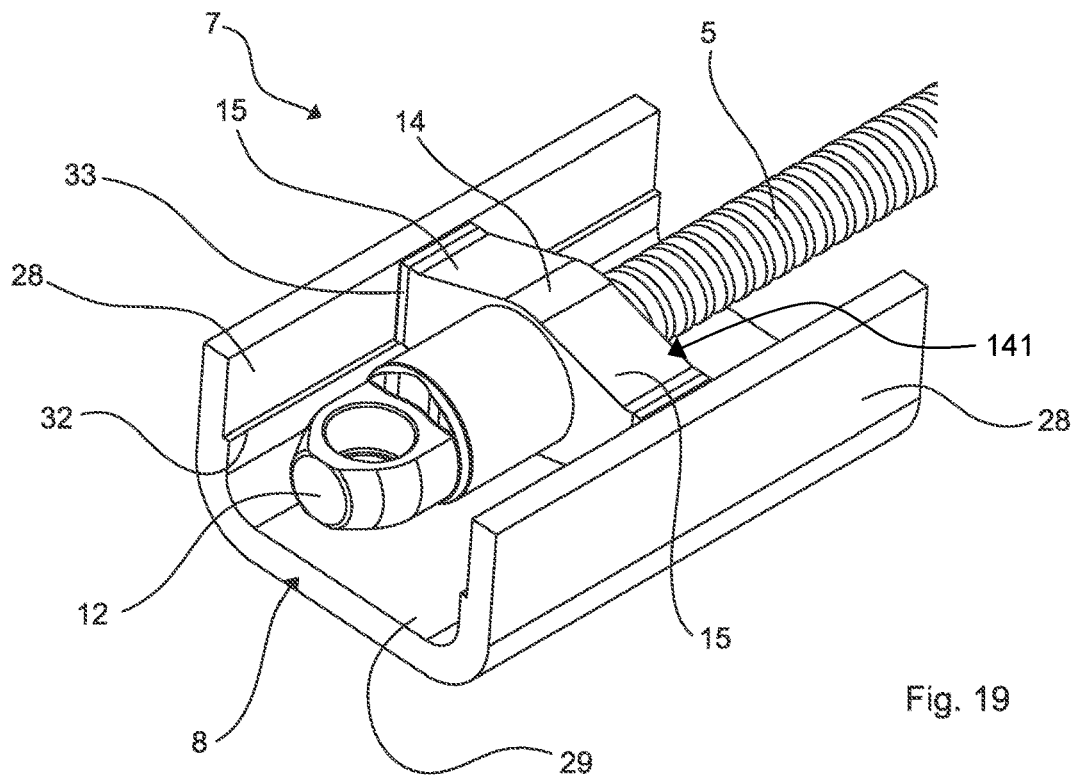
FIG. 19 shows a lateral force absorbing mechanism used in the embodiment of the FIG. 15 in a detailed perspective view.

FIG. 19 illustrates the components involved in the conveyance of the lateral force to the rack 3 according to the third embodiment. The stabilizing element 14 is arranged between the rod element 5 and the support assembly 8 of the lateral force absorbing mechanism 7. Each element of the support assembly 8 has two frame wings 28 and a frame base 29 connecting the frame wings 28. The stabilizing element 14 has two wing elements 15 that protrude from the rod element 5. In the present example, the wing elements 15 extend in the horizontal direction. The engagement between the stabilizing element 14 and the support assembly 8 for transmitting a force is realized by an edge-type protrusion 32 in each of the frame wings 28. Similar to the further embodiments, a rotation of the wing elements 15 about the rotational axis defined by the rod element 5 is prevented, while a shift along this rotational axis is enabled. A slide coating 33 is arranged at the faces of the end portions of each of the wing elements 15 of the stabilizing elements 14 on both sides of the outer portions 141 of the stabilizing element 14. These enhance the shift of the stabilizing element 14 along the support assembly 8 effected by a steering operation by reducing the friction coefficient. In the third embodiment, the transmission of the force that is required for an efficient conveyance of the lateral force from the stabilizing element 14, according to the principle of the present invention, is achieved by an interlocking engagement with the respective protrusion 32 in the frame wing 28. The sliding surfaces, as well as the point of contact between the outer portions 141 and the protrusion 32, serve as mating surfaces between the stabilizing element 14 and the support assembly 8 if a lateral force is transmitted from the transmission member 22 to the rod element 5 through the rod element attachment member 12 and further through the stabilizing element 14 to the support assembly 8. The stabilizing element 14 has two wing elements 15 that taper towards the outer region, that is, towards the frame wings 28.

Figure 20:
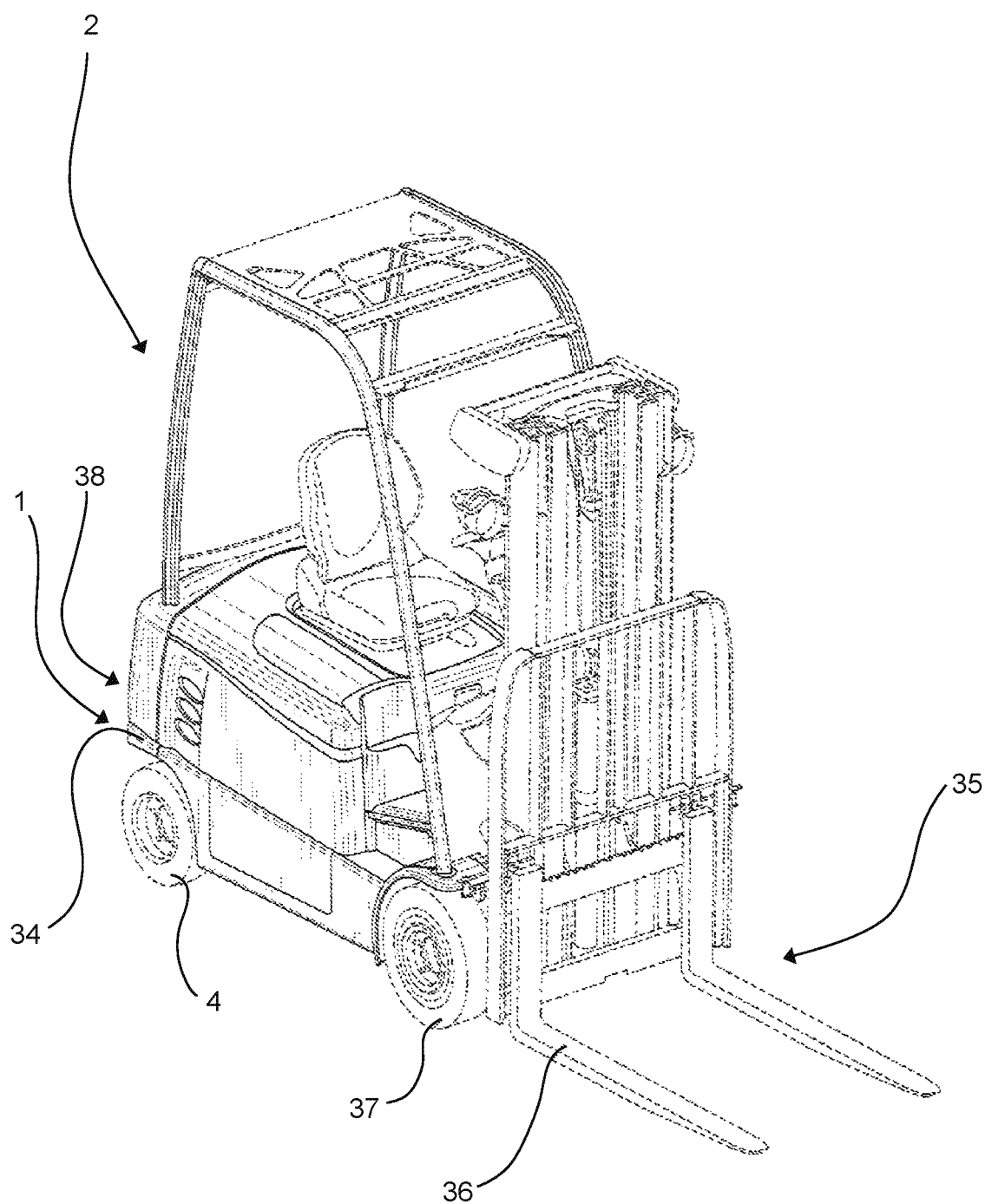
FIG. 20 shows a perspective view of a vehicle embodied as counterbalance forklift truck to which the electrically operated steering system according to the embodiments is applied.

In FIG. 20, a vehicle 2 is illustrated in the exemplary form of a counter balanced forklift truck 2. In this vehicle 2, the electrically operated steering system 1 is integrated in the rear portion thereof. The electrically operated steering system 1 is mounted with the rack 3 to a vehicle frame 34. In the front portion of the vehicle 2, a lift frame 35 that comprises a carriage 36 and at least one front wheel 37 are arranged. A counter balance 38 is arranged in the rear portion according to the principle of the counter balance forklift truck 2.

In the previously discussed embodiments, the electrically operated steering system 1 comprises the conversion mechanism 11, which is arranged for converting a rotation of the electric machine 6 into a translational movement of the rod element 5 in relation to the conversion mechanism 11, e.g., in relation to the rack 3. In this case, the conversion mechanism 11 is configured to enable the conversion of the rotation of the electric machine 6 into the translational movement of the rod element 5. According to an embodiment, the rod element 5 is fixed in the rotational direction in relation to the conversion mechanism 11 and the translational movement of the rod element 5 is effected by the rotation of a threaded component in relation to the rod element 5, which engages the thread of the rod element 5 that is formed as a spindle. Based on this concept, a thread-type drive of the rod element 5 is effected thereby achieving the translational movement of the rod element 5. In principle, the rod element 5 is supported at the rack 3.

In an embodiment, the rod element 5 is fixed in the rotational direction by the kinematic unit 13 mounted thereto. In this case, the lug portion 23 is mounted fixedly in the rotational direction to the rod element 5, while the lug portion 23 is, with respect to the rotation direction in relation to the longitudinal axis of the rod element 5, fixedly mounted to the transmission member 22, which is hingedly supported on both sides. In this embodiment, the corresponding construction is designed such as to inhibit a rotation of the rod element 5 in relation to the rack 3. The thread component in this embodiment is formed with an inner thread and is rotatably arranged in the conversion mechanism 11. In this case, the thread component is immovable in the longitudinal direction of the rod element 5 such that the rotation of the thread component in relation to the rod element 5 effects the translational movement of the rod element 5.

The connection between the electric machine 6 and the thread component of the conversion mechanism 11 comprises in some embodiments a gear transmission, a thong transmission, or other means. The thread component according to an embodiment is formed as ball circulating system, whereby the friction and the accuracy of the operation is enhanced. However, in further embodiments, differently formed thread components may be used as long as the rotation of the thread component in relation to the rod element 5 has the intended effect. In a further embodiment, a system is employed in which the rod element 5, which is formed as a spindle, is rotated and in which the thread component is held stationary. In order to achieve such an arrangement, the elements of the system would be adapted accordingly.

In an embodiment, the vehicle 2 to which the electrically operated steering system 1 is applied comprises two axles, wherein one of the axles serves as a drive axle and comprises non-steerable wheels, and wherein the other axle is provided with the electrically operated steering system 1 with steerable wheels 4. With a vehicle according to this embodiment, a zero turn functionality is achieved if the steerable wheels 4 are positioned as shown, for example, in FIG. 6, 13, or 18. In this embodiment, the vehicle turns about a vertical axis that crosses the connecting line between the centres of the non-steerable wheels. The driving arrangement for the non-steerable wheels is adapted accordingly in order to control the opposite rotation of the non-steerable wheels, which is the result of the zero turn situation. In an embodiment, wheel hub motors are used in order to drive the steerable wheels 4 in addition or as an alternative to the non-steerable wheels.

In a further embodiment, the vehicle comprises two axles, each of which are equipped with the electrically operated steering system 1. In this case, the vehicle can be controlled such that the vehicle turns about a vertical axis that is located inside the vehicle and, in particular, which crosses a central region of the vehicle. In this case, all the wheels are steerable wheels and the operation for driving the wheels is achieved by wheel hub motors, for example.

In each of the above discussed embodiments, when using the conversion mechanism 11 and the rod element 5 for effecting a steering movement at the steerable wheels 4, the influence of the lateral force produced by the kinematic unit 13 to the conversion mechanism 11 and to the rod element 5 is reduced. This effect is, in particular, relevant at high steering angles that occur upon using a zero turn functionality, for example. Consequently, the concept according to the present invention makes possible the use of system components in a vehicle with a zero turn functionality, which are in principle not adapted and designed for absorbing lateral forces, such as the rod element 5 formed as a spindle, which is driven by a threaded component of the conversion mechanism 11 by a ball circulating system, for example.

| Reference Signs | |
|---|---|
| 1 | steering system |
| 2 | counter balance forklift truck |
| 3 | rack |
| 301 | bottom rack platform |
| 302 | top rack platform |
| 303 | rack wall |
| 4 | wheel |
| 5 | rod element |
| 6 | electric machine |
| 7 | lateral force absorbing mechanism |
| 8 | support assembly |
| 9 | vehicle length direction |
| 10 | vehicle width direction |
| 11 | conversion mechanism |
| 12 | rod element attachment member |
| 13 | kinematic unit |
| 14 | stabilizing element |
| 141 | outer portion |
| 15 | wing element |
| 16 | guiding member |
| 161 | sliding surface |
| 162 | guiding member shoulder |
| 163 | guiding member base |
| 17 | guiding bore |
| 18 | central flange unit |
| 181 | coupling portion |
| 182 | pivot member |
| 183 | connecting pin |
| 19 | steering axis |
| 20 | bolt |
| 21 | axle journal |
| 22 | transmission member |
| 23 | lug portion |
| 24 | shoulder portion |
| 25 | housing |
| 26 | central region |
| 27 | chain protection assembly |
| 28 | frame wing |
| 29 | frame base |
| 30 | wheel carrier |
| 31 | rotary encoder |
| 32 | protrusion |
| 33 | slide coating |
| 331 | slide bushing |
| 34 | vehicle frame |
| 35 | lift frame |
| 36 | carriage |
| 37 | front wheel |
| 38 | counter balance |
| 39 | outer stopper |
| 40 | inner stopper |

What is claimed is:

1. An electrically operated steering system for a vehicle, wherein said electrically operated steering system comprises: a rack for attaching said steering system to a vehicle frame of a vehicle; two steerable wheels pivotably attached to said rack; a rod element arranged to said rack, said rod element being slidable in its longitudinal direction in relation to said rack; a kinematic unit coupled to said rod element and which transforms a movement of said rod element to a steering rotation of said wheels; an electric machine mechanically connected to said rod element for effecting the movement of said rod element; and a lateral force absorbing mechanism configured for absorbing a lateral force produced by said kinematic unit in relation to said rod element; wherein said lateral force absorbing mechanism is configured for absorbing a lateral force acting between said kinematic unit and said rod element to convey said lateral force to said rack; wherein said lateral force absorbing mechanism comprises a support assembly connected to said rack, said support assembly absorbing said lateral force and extending at least partially along said rod element, wherein said lateral force absorbing mechanism comprises a stabilizing element engaged to said support assembly for transmitting said lateral force to said support assembly, said stabilizing element being provided between said rod element and said support assembly, and wherein said kinematic unit is connected to a lug portion to which said stabilizing element is directly coupled.

2. The electrically operated steering system for a vehicle according to claim 1, characterized in that said lateral force absorbing mechanism is configured for conveying a lateral force produced by said kinematic unit to said rack.

3. The electrically operated steering system according to claim 1, characterized in that said lateral force absorbing mechanism comprises a support assembly connected to said rack, said support assembly absorbing said lateral force and extending at least partially along said rod element.

4. The electrically operated steering system according to claim 3, characterized in that said support assembly extends at least partially along a movement path of said rod element and is arranged substantially parallel to said movement path of said rod element.

5. The electrically operated steering system according to claim 3, characterized in that said lateral force absorbing mechanism comprises a stabilizing element engaged to said support assembly for transmitting said lateral force to said support assembly, said stabilizing element being provided between said rod element and said support assembly.

6. The electrically operated steering system according to claim 5, characterized in that said stabilizing element is arranged in a region of an end portion of said rod element that is facing towards the respective wheel.

7. The electrically operated steering system according to claim 5, characterized in that said stabilizing element is immovably connected to said rod element with respect to a longitudinal direction of said rod element.

8. The electrically operated steering system according to claim 5, characterized in that said stabilizing element comprises wing elements that protrude in two radial directions in relation to said rod element.

9. The electrically operated steering system according to claim 8, characterized in that said wing elements of said stabilizing element are substantially wedge-shaped and tapered towards the radial outer direction.

10. The electrically operated steering system according to claim 5, characterized in that said support assembly comprises at least two frame wings, wherein one or both frame wings are contactable to said stabilizing element.

11. The electrically operated steering system according to claim 10, characterized in that at least one frame wing comprises at least one protrusion, which enables an engagement between said stabilizing element and said support assembly at least in a rotational direction about a rotational axis defined by said rod element.

12. The electrically operated steering system according to claim 10, characterized in that said frame wings are connected by a frame base in such a way that said support assembly defines at least partially a C-shape in its cross section.

13. The electrically operated steering system according to claim 5, characterized in that said support assembly comprises at least two guiding members on two opposite sides of said rod element, said guiding members being arranged separately from each other and extending along said rod element.

14. The electrically operated steering system according to claim 13, characterized in that said guiding members have a cross section that is open towards the stabilizing element, wherein an outer portion of said stabilizing element is guided along a longitudinal direction of said rod element in such a way that said outer portion is restricted in its rotational movement by the respective guiding member.

15. The electrically operated steering system according to claim 13, characterized in that said guiding members are each formed with a round cross section and each are led through a respective guiding bore that is provided in said stabilizing element in order to guide said stabilizing element along the longitudinal direction of said rod element.

16. The electrically operated steering system according to claim 5, characterized in that a slide coating is provided on at least one of: a surface of said stabilizing element contacting said support assembly or on a surface of said support assembly contacting said stabilizing element, wherein the slide coating improves a movement of said stabilizing element with said rod element in relation to said support assembly in the longitudinal direction of said rod element.

17. The electrically operated steering system according to claim 1, characterized in that between a respective end portion of said rod element and the respective wheel a respective kinematic unit is arranged that is designed to enable a steering rotation of the corresponding wheel in an angle range of at least 175°.

18. The electrically operated steering system according to claim 17, characterized in that said kinematic unit comprises an axle journal, said axle journal being pivotable together with said wheel about a steering axis and radially protruding from said steering axis, said axle journal being coupled to said rod element with a transmission member being hingedly connected on both sides, said transmission member being arranged for transforming a movement of said rod element into a rotation of said axle journal and thus of said wheel.

19. The electrically operated steering system according to claim 18, characterized in that said transmission member is coupled to said rod element via a lug portion that is mountable to said rod element.

20. The electrically operated steering system according to claim 1, characterized in that said rod element is at least partially formed as a threaded spindle.

21. The electrically operated steering system according to claim 1, characterized in that said electrically operated steering system further comprises a conversion mechanism configured for converting a rotation of said electric machine into a translational movement of said rod element in relation to said conversion mechanism.

22. The electrically operated steering system according to claim 21, characterized in that said rod element is mounted in a torque proof manner in relation to said conversion mechanism, wherein a translational movement of said rod element is effected by a rotation of a threaded component in relation to said rod element, said threaded component engaging with thread on said threaded spindle.

23. The electrically operated steering system according to claim 22, characterized in that said electric machine is coupled to said threaded component in order to effect a rotation of said threaded component of said conversion mechanism.

24. The electrically operated steering system according to claim 1, characterized in that said electrically operated steering system further comprises a controller that is configured to control a rotation of said electric machine such that an actual steering angle approaches a predefinable target steering angle.

25. The electrically operated steering system according to claim 1, characterized in that said rack is attachable to a vehicle by a central flange unit.

26. The electrically operated steering system according to claim 1, wherein the elements that relate to the drive of the steering system are accommodated in a compartment that is arranged above the rotational centres of the wheels.

27. The electrically operated steering system according to claim 26, wherein the elements comprise the conversion mechanism, the rod element, and the kinematic unit.

28. The electrically operated steering system according to claim 26, wherein the compartment is closed off to the environment for protection of the elements.

29. A vehicle comprising a vehicle frame and at least one electrically operated steering system mounted to said vehicle frame by means of a rack, wherein the electrically operated steering system comprises: the rack for attaching said steering system to the vehicle frame; two steerable wheels pivotably attached to said rack; a rod element arranged to said rack, said rod element being slidable in its longitudinal direction in relation to said rack; a kinematic unit coupled to said rod element and which transforms a movement of said rod element to a steering rotation of said wheels; an electric machine mechanically connected to said rod element for effecting the movement of said rod element; and a lateral force absorbing mechanism configured for absorbing a lateral force produced by said kinematic unit in relation to said rod element; wherein said lateral force absorbing mechanism is configured for absorbing a lateral force acting between said kinematic unit and said rod element to convey said lateral force to said rack; wherein said lateral force absorbing mechanism comprises a support assembly connected to said rack, said support assembly absorbing said lateral force and extending at least partially along said rod element, wherein said lateral force absorbing mechanism comprises a stabilizing element engaged to said support assembly for transmitting said lateral force to said support assembly, said stabilizing element being provided between said rod element and said support assembly, and wherein said kinematic unit is connected to a lug portion to which said stabilizing element is directly coupled.

30. The vehicle according to claim 29, wherein said vehicle is operable with a zero turn functionality.

31. A counterbalance forklift comprising:
- a vehicle frame, a lift frame with a carriage, the lift frame arranged in a front side in relation to a vehicle longitudinal direction;
- a stabilizing counterweight arranged on the rear side in relation to the vehicle longitudinal direction, said counterweight being adapted to counteract a tilting of said counterbalance forklift truck;
- at least one front wheel arranged on the front side in relation to the vehicle longitudinal direction;
- wherein said counterbalance forklift truck further comprises an electrically operated steering system according to claim 1, the electrically operated steering system being arranged on the rear side in relation to the vehicle longitudinal direction on said vehicle frame by means of said rack and which is configured for steering rear wheels of said counterbalance forklift truck.

32. The counterbalance forklift truck according to claim 31, wherein said counterbalance forklift truck is operable with a zero turn functionality.

* * * * *